United States Patent
Li et al.

(10) Patent No.: US 12,556,734 B2
(45) Date of Patent: Feb. 17, 2026

(54) DEFINING A SEARCH RANGE FOR MOTION ESTIMATION FOR EACH SCENARIO FRAME SET

(71) Applicant: Tencent Technology (Shenzhen) Company Limited, Guangdong (CN)

(72) Inventors: Yufeng Li, Shenzhen (CN); Wei Guo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 337 days.

(21) Appl. No.: 17/963,938

(22) Filed: Oct. 11, 2022

(65) Prior Publication Data
US 2023/0030020 A1 Feb. 2, 2023

Related U.S. Application Data

(63) Continuation of application No. PCT/CN2021/135372, filed on Dec. 3, 2021.

(30) Foreign Application Priority Data

Dec. 4, 2020 (CN) .......................... 202011401743.1

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/176* (2014.11); *H04N 19/85* (2014.11)

(58) Field of Classification Search
CPC .. H04N 19/105; H04N 19/114; H04N 19/142; H04N 19/172; H04N 19/176;
(Continued)

(56) References Cited

U.S. PATENT DOCUMENTS 6,418,166 B1 * 7/2002 Wu ...................... H04N 19/567
375/240.12
8,363,713 B2 * 1/2013 Chuang ................ H04N 19/433
375/240.12
(Continued)

FOREIGN PATENT DOCUMENTS

CN 1767646 A 5/2006
CN 101184235 A 5/2008
(Continued)

OTHER PUBLICATIONS

International Search Report and Written Opinion issued in International Application No. PCT/CN2021/135372, mailed Feb. 22, 2022, with English Translation, 9 pages.
(Continued)

*Primary Examiner* — Nathnael Aynalem
(74) *Attorney, Agent, or Firm* — ArentFox Schiff LLP

(57) ABSTRACT

A video motion estimation method including obtaining a plurality of image frames in a video, and performing scenario classification processing on the plurality of image frames to obtain a plurality of image frame sets. The method further includes extracting a contour feature and a color feature of a foreground object of each image frame, and determining a search range corresponding to each image frame set. The method further includes determining a starting search point in each predicted frame. The method further includes, for each image frame set, performing motion estimation processing in a search region corresponding to the search range of each predicted frame set based on the starting search point of the respective predicted frame, a reference block in at least one reference frame of the respective image frame set, and the color feature of the foreground object, to obtain a motion vector corresponding to the reference block.

20 Claims, 9 Drawing Sheets

(51) Int. Cl.
*H04N 19/176* (2014.01)
*H04N 19/85* (2014.01)

(58) Field of Classification Search
CPC .... H04N 19/513; H04N 19/537; H04N 19/56; H04N 19/57; H04N 19/573; H04N 19/85; H04N 9/3147; H04N 9/3179; H04N 9/3182; H04N 19/52; H04N 19/517; H04N 19/50; H04N 19/503; G06V 20/49; G06V 10/764
USPC ............................................. 375/240–240.29
See application file for complete search history.

(56) References Cited

U.S. PATENT DOCUMENTS

| | | | |
|---|---|---|---|
| 10,057,593 | B2 | 8/2018 | Richert |
| 2002/0057739 | A1 | 5/2002 | Hasebe et al. |
| 2003/0229719 | A1 | 12/2003 | Iwata et al. |
| 2004/0202245 | A1 | 10/2004 | Murakami et al. |
| 2009/0087096 | A1* | 4/2009 | Eaton ................. G06V 10/28 382/190 |
| 2013/0051473 | A1* | 2/2013 | Chen .................. H04N 19/533 375/E7.125 |
| 2014/0269896 | A1 | 9/2014 | Dao |
| 2016/0360225 | A1* | 12/2016 | Diggins .............. H04N 19/587 |
| 2018/0324456 | A1* | 11/2018 | Alshin ................ H04N 19/105 |
| 2019/0045193 | A1 | 2/2019 | Socek et al. |

FOREIGN PATENT DOCUMENTS

| | | | |
|---|---|---|---|
| CN | 101640809 | A | 2/2010 |
| CN | 102006475 | A | 4/2011 |
| CN | 102075757 | A | 5/2011 |
| CN | 102572438 | A | 7/2012 |
| CN | 103503454 | A | 1/2014 |
| CN | 103796028 | A | 5/2014 |
| CN | 108777798 | A | 11/2018 |
| CN | 110677624 | A | 1/2020 |
| CN | 110827328 | A | 2/2020 |
| CN | 112203095 | A | 1/2021 |
| JP | 2000-023190 | A | 1/2000 |
| JP | 2001-086507 | A | 3/2001 |
| JP | 2005-523541 | A | 8/2005 |
| JP | 2016-063358 | A | 4/2016 |
| KR | 20070079717 | A | 8/2007 |
| KR | 10-2016-0134768 | A | 11/2016 |

OTHER PUBLICATIONS

Chinese Office Action issued in Application No. 202011401743.1 mailed Jan. 20, 2021 with English Translation (27 pages).
Extended European Search Report and Search Opinion received for European Application No. 21900100.5, mailed on Apr. 23, 2024, 11 pages.
Office Action received for Japanese Patent Application No. 2023-518852, mailed on Apr. 1, 2024, 13 pages (6 pages of English Translation and 7 pages of Original Document).
Nehal N. Shah et al., ."Hardware Efficient Double Diamond Search Block Matching Algorithm for Fast Video Motion Estimation", J Sign Process Syst, DOI 10.1007/s11265-015-0993-5, (2015), (21 Pages total).
Bing Han et al., "The region based MMTD energy function for image segmentation", Multimedia Tools and Applications, https://doi.org/10.1007/s11042-018-7001-6, (2018), (32 pages total).
Baishik Biswas et al., "An Efficient VLSI Architecture of the Enhanced Three Step Search Algorithm", J. Inst. Eng. India Ser. B, DOI 10.1007/s40031-014-0177-x, (2015), (7 pages total).
Office Action received for Japanese Patent Application No. 2023-518852, mailed on Oct. 15, 2024, 15 pages (7 pages of English Translation and 8 pages of Original Document).
Office Action received for Korean Patent Application No. 10-2023-7010460, mailed on May 27, 2025, 16 pages (9 pages of English Translation and 7 pages of Original Document).

* cited by examiner

DEFINING A SEARCH RANGE FOR MOTION ESTIMATION FOR EACH SCENARIO FRAME SET

RELATED APPLICATIONS

This application is a continuation of International Application No. PCT/CN2021/135372, filed on Dec. 3, 2021, which claims priority to Chinese Patent Application No. 202011401743.1 filed on Dec. 4, 2020. The entire disclosures of the prior applications are hereby incorporated by reference.

FIELD OF THE TECHNOLOGY

This application relates to the field of video motion estimation technologies, including a video motion estimation method and apparatus, a device, a computer-readable storage medium and a computer program product.

BACKGROUND OF THE DISCLOSURE

With the rapid development of Internet technologies and the wide popularization of digital devices, videos have gradually become an important carrier for people in information acquisition and information communication. In addition to ever-increasing user requirements on video service, demands for video quality are getting higher and higher. Therefore, increasing the efficiency of video encoding and transmission becomes a hot issue in the industry.

Because high-quality video data has a high degree of redundancy and a large amount of information, to satisfy a transmission and storage requirement in a related network field, the video data needs to be compressed. Inter frame prediction may be used in video compression to remove a temporal redundancy in a sequence frame, while motion estimation is a key technology widely applied to the inter frame prediction in video encoding. However, the motion estimation is very time-consuming and accounts for 70% of the computation of the entire video encoding, the ratio being even higher for a high-definition video. Therefore, a motion estimation algorithm is a main factor in determining video compression efficiency, and a key objective of speeding up a video compression process is to lower computing costs of the motion estimation and improve motion estimation accuracy to make a search process stronger, faster, and more efficient.

SUMMARY

Embodiments of this disclosure provide a video motion estimation method and apparatus, a device, a computer-readable storage medium and a computer program product, which can improve search efficiency and motion estimation accuracy.

In an embodiment, a video motion estimation method includes obtaining a plurality of image frames in a video, and performing scenario classification processing on the plurality of image frames to obtain a plurality of image frame sets. Each image frame set is associated with a corresponding scenario and comprising plural image frames. The method further includes extracting a contour feature and a color feature of a foreground object of each image frame in each image frame set, and determining a search range corresponding to each image frame set based on the contour feature of the foreground object of the image frames in each image frame set. The method further includes determining a starting search point in each predicted frame in each image frame set, wherein each image frame set comprises at least one predicted frame and at least one reference frame. The method further includes, for each image frame set, performing motion estimation processing in a search region corresponding to the search range of each predicted frame in the respective image frame set based on the starting search point of the respective predicted frame, a reference block in the at least one reference frame of the respective image frame set, and the color feature of the foreground object, to obtain a motion vector corresponding to the reference block.

In an embodiment, a video motion estimation apparatus includes processing circuitry configured to obtain a plurality of image frames in a video, and performing scenario classification processing on the plurality of image frames to obtain a plurality of image frame sets. Each image frame set is associated with a corresponding scenario comprising plural image frames. The processing circuitry is further configured to extract a contour feature and a color feature of a foreground object of each image frame in each image frame set, and determine a search range corresponding to each image frame set based on the contour feature of the foreground object of the image frames in each image frame set. The processing circuitry is further configured to determine a starting search point in each predicted frame in each image frame set wherein each image frame set comprises at least one predicted frame and at least one reference frame. The processing circuitry is further configured to, for each image frame set, perform motion estimation processing in a search region corresponding to the search range of each predicted frame in the respective image frame set based on the starting search point of the respective predicted frame, a reference block in the at least one reference frame of the respective image frame set, and the color feature of the foreground object, to obtain a motion vector corresponding to the reference block.

In an embodiment, a non-transitory computer-readable storage medium stores computer-readable instructions thereon, which, when executed by a processor, cause the processor to perform a video motion estimation method. The method includes obtaining a plurality of image frames in a video, and performing scenario classification processing on the plurality of image frames to obtain a plurality of image frame sets. Each image frame set is associated with a corresponding scenario and comprising plural image frames. The method further includes extracting a contour feature and a color feature of a foreground object of each image frame in each image frame set, and determining a search range corresponding to each image frame set based on the contour feature of the foreground object of the image frames in each image frame set. The method further includes determining a starting search point in each predicted frame in each image frame set, wherein each image frame set comprises at least one predicted frame and at least one reference frame. The method further includes, for each image frame set, performing motion estimation processing in a search region corresponding to the search range of each predicted frame in the respective image frame set based on the starting search point of the respective predicted frame, a reference block in the at least one reference frame of the respective image frame set, and the color feature of the foreground object, to obtain a motion vector corresponding to the reference block.

The search range corresponding to each image frame set is determined based on the contour feature of the foreground object of each image frame set, and the motion estimation is performed in the search region corresponding to the search range of each predicted frame based on each starting search point, the target block (reference block) in the reference frame and the color feature of the foreground object, so as to search in a certain range. Therefore, the search range is narrowed down, and the time for searching can be reduced. In addition, the search range is limited based on the contour feature of the foreground object in each scenario, thereby improving the motion estimation accuracy.

DESCRIPTION OF EMBODIMENTS

Figure 1:
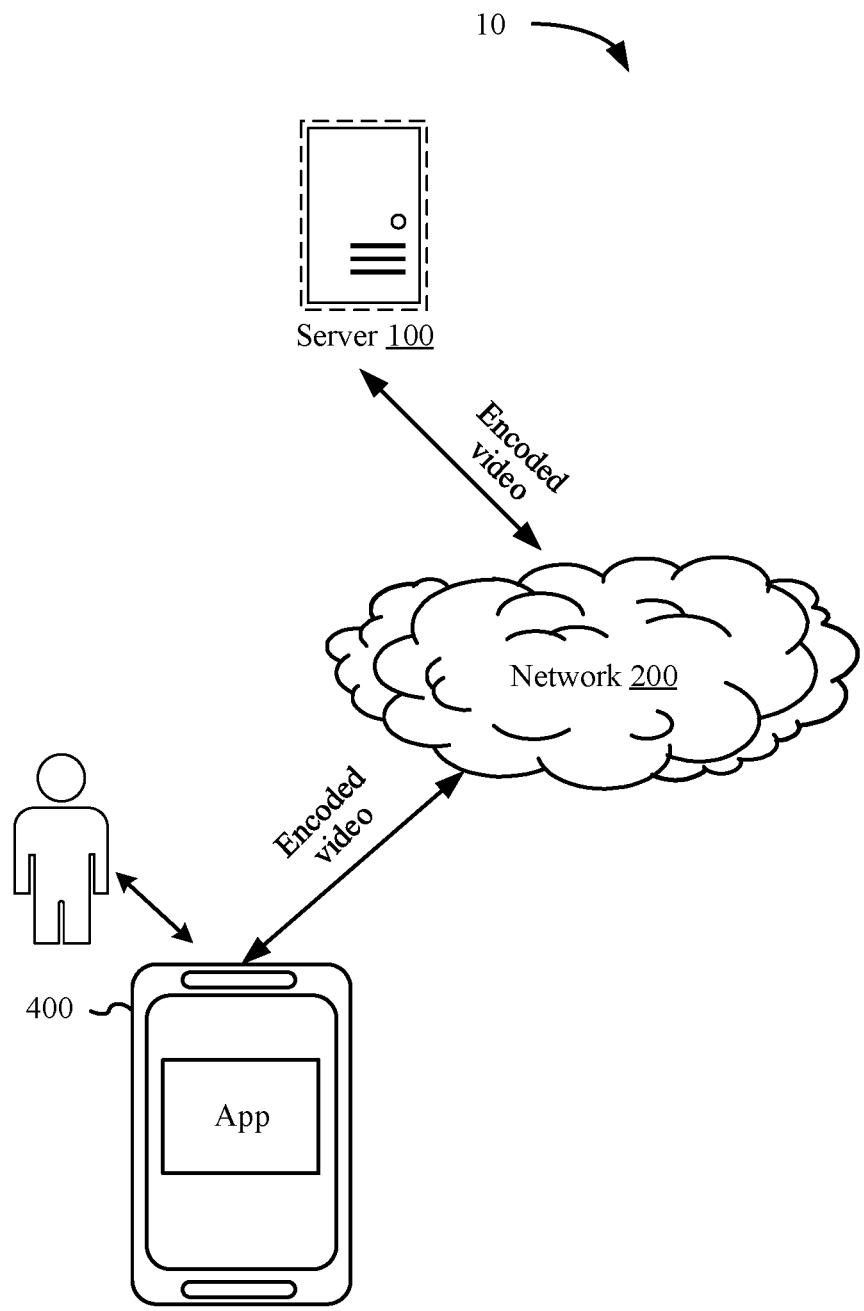
FIG. 1 is a schematic diagram of a system architecture of a video motion estimation system according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art shall fall within the protection scope of this disclosure.

In the following descriptions, related "some embodiments" describe a subset of all possible embodiments. However, it may be understood that the "some embodiments" may be the same subset or different subsets of all the possible embodiments, and may be combined with each other without conflict. Unless otherwise defined, meanings of all technical and scientific terms used in the embodiments of this disclosure are the same as those usually understood by a person skilled in the art to which the embodiments of this disclosure belong. Terms used in the embodiments of this disclosure are merely intended to describe objectives of the embodiments of this disclosure, but are not intended to limit this disclosure.

Before the embodiments of this disclosure are further described in detail, nouns and terms involved in the embodiments of this disclosure are described. The nouns and terms provided in the embodiments of this disclosure are applicable to the following explanations.

1) Motion estimation: a technology used in video encoding, and a process of computing a motion vector between a current frame and a reference frame during compression of encoding 2) Motion vector: representing a vector of relative displacement between a best matching block of a current encoding block and an optimal matching block in a reference image 3) Optical flow: when a human eye observes a moving object, a scenario of the object forms a series of continuously changing images on a retina of the human eye, and this series of continuously changing information continuously "flows" through the retina (that is, an image plane), like a kind of light "flow", so called optical flow.

4) Optical flow method: a method which uses a temporal change of a pixel in an image sequence and a correlation between adjacent frames to determine a corresponding relationship between a previous frame and a current frame, so as to calculate motion information of an object between the adjacent frames In order to understand a video motion estimation method according to the embodiments of this disclosure better, video motion estimation and the video motion estimation method in a related art are described first:

In an inter frame prediction encoding method of video compression, there is a certain correlation between video contents in consecutive frames temporally, so that the video motion estimation method in the related art is to divide each image frame of a video sequence into a plurality of non-overlapping blocks or macroblocks of the same size first, and assume that displacement amounts of all pixels in a macroblock are the same, and then find out a most similar target matching block in an adjacent reference frame for each block or macroblock according to a certain matching solution, and finally calculate a relative offset of spatial locations between the macroblock and the target matching block, that is the motion vector. A process of obtaining the motion vector is the motion estimation.

The core idea of the motion estimation is obtaining the motion vector between frames in the video sequence as accurately as possible, which is mainly used for a motion compensation between the frames. A compensation residual needs to be transformed, quantized, and encoded, and then entropy encoded together with the motion vector, and transmitted to a decoder side in a form of a bit stream. A current block or a current macroblock may be restored in the decoder side through these two data (that is, the compensation residual and the motion vector). In video transmission, a data redundancy may be removed effectively by using the motion estimation method, so as to reduce a data volume of transmission. The accuracy of the motion vector determines the quality of a video frame for a predicted compensation. The higher quality, the less compensation residual, the fewer bits required for a compensation encoding, and the lower requirement on a bit rate of transmission.

The motion estimation method in the related art includes spatial domain motion estimation and frequency domain motion estimation. The spatial domain motion estimation includes motion estimation which is global-based, or based on a pixel point, a macroblock, a region, a grid or the like. The frequency domain motion estimation includes a phase method, a discrete cosine transform method, a wavelet domain method and the like. A spatial domain motion estimation method becomes a favored method for a large amount of researchers in these years due to features such as a relatively quick computation speed, a low complexity degree, and being easily implemented in multiple hardware platforms. The spatial domain motion estimation methods may include global search and quick search according to the matching search range. The global search mainly performs an exhaustive search on all regions within the search range, and has the highest accuracy, but the computational complexity is also high and real-time processing is difficult to achieve. However, the quick search performs a search on macroblocks in a part of the search region in the search region according to a set rule. Therefore, compared to the global search, the quick search has a quick search speed, but may not search for an optimal block. For example, a diamond search (DS), a three step search (TSS), and a four step search (FSS) are all quick motion estimation methods based on local search, and speed up the search speed mainly through limiting a search step or a search point, or using a proper search template. An official test model of high efficiency video coding (HEVC) provides two basic search methods: a full search algorithm and a test zone (TZ) search algorithm, the TZSearch algorithm being a quick search method based on a mixed search model (a diamond search and a raster search). In the related art, most research for a block search method are based on the TZSearch algorithm to improve block search speed and accuracy thereof, where most work performs optimization on aspects such as reducing the number of a search block or the macroblock, introducing a threshold, changing a search strategy, and reusing data. However, in reality, for most videos, there exist problems such as jitter during shooting under a moving condition, low contrast in an image frame, and complex continuous changes in a motion scenario, which easily result in a mismatch of blocks, causing an obvious blurring or block effect in an obtained compensated frame. For the quick motion estimation method proposed in these problems, an effective trade-off between computational resources and computational accuracy is required, which further challenges to a more efficient motion estimation method.

The quick motion estimation method provided in the related art is better than a full search method. However, most calculation methods of the quick search have irregularities in data access, and the search efficiency still needs to be improved. In addition, when the motion estimation method in the related art is used for dealing with a special video such as shaking during shooting, low image frame contrast, and continuous changes in a motion scenario, an incorrect matching of a sub-bock may exist in obtaining an optimal motion vector of a current block, which may readily lead to obvious blurring and a block effect of an obtained interpolated frame.

Based on this, in the video motion estimation method provided by the embodiment of this disclosure, a consecutive image frame is used as a whole to calculate an object. and a foreground image processing is added into a limitation on the search range. Through the restriction of a video content feature, the search time may be effectively reduced and accuracy rate of the motion estimation may be improved.

Exemplary applications of a video motion estimation device according to the embodiment of this disclosure are described in the following. The video motion estimation device according to the embodiment of this disclosure may be implemented as any terminal with a screen display function such as a notebook computer, a tablet computer, a desktop computer, a mobile device (for example, a mobile phone, a portable music player, a personal digital assistant, a dedicated messaging device, or a portable game device), or an intelligent robot, or may be implemented as a server.

An exemplary application that the video motion estimation device is implemented as a terminal is described in the following.

FIG. 1 is a schematic diagram of an architecture of a video motion estimation system 10 according to an embodiment of this disclosure. As shown in FIG. 1, the video motion estimation system 10 includes a terminal 400, a network 200 and a server 100. An application program, such as an image capture application program or an instant messaging application program, runs on the terminal 400. During implementing the video motion estimation method of the embodiment of this disclosure, the terminal 400 obtains a to-be-processed video, where the video may be obtained by an image capture apparatus built in the terminal 400, for example, the video may be a video recorded by a camera in real time, or a video stored locally in the terminal. After obtaining the to-be-processed video, the terminal 400 classifies a plurality of image frames included in the video based on scenarios, extracts a contour feature of a foreground object from the plurality of image frames included in each scenario, and determines a search range based on the contour feature. Each scenario corresponds to one search range. In the plurality of image frames of the same scenario, a target block corresponding to a reference frame is searched in a search region determined in the search range, so that a motion vector is determined and a motion estimation process is completed. As a result, the terminal 400 sends the reference frame and the motion vector obtained through the motion estimation to the server, where the server may perform motion compensation based on the motion vector so as to obtain a complete video file.

An exemplary application that the video processing apparatus is implemented as a server is described in the following.

Referring to FIG. 1, an application program, such as an image capture application program or an instant messaging application program, runs on the terminal 400. During implementing the video motion estimation method of the embodiment of this disclosure, the terminal 400 obtains a to-be-processed video, and sends the to-be-processed video to the server 100. After obtaining the to-be-processed video, the server 100 classifies a plurality of image frames included in the video based on scenarios, extracts a contour feature of a foreground object from the plurality of image frames included in each scenario, and determines a search range based on the contour feature. Each scenario corresponds to one search range. In the plurality of image frames of the same scenario, a target block corresponding to a reference frame is searched in a search region determined in the search range, so that a motion vector is determined and a motion estimation process is completed. Motion compensation is performed based on the motion vector so as to obtain a complete video file.

Figure 2:
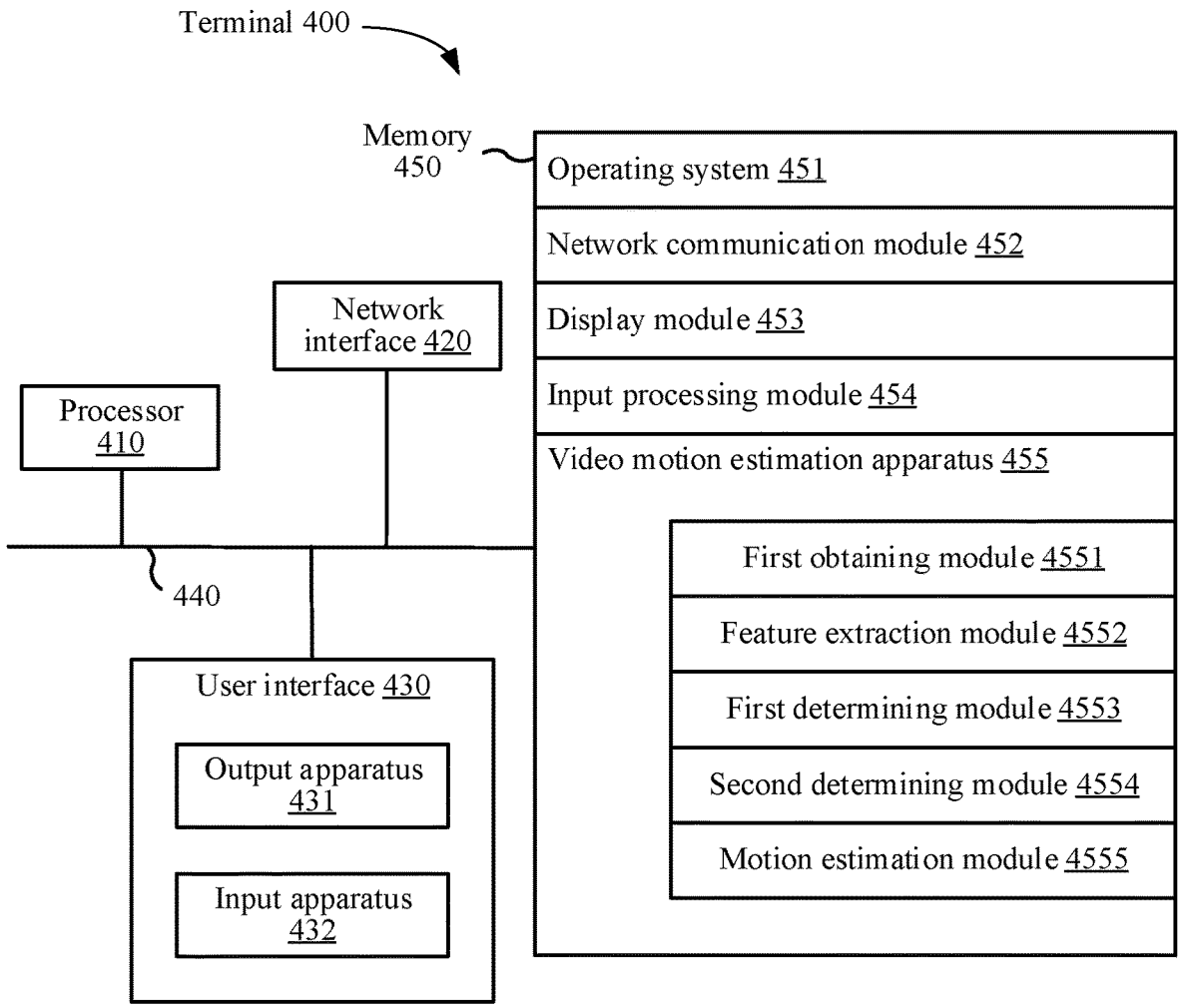
FIG. 2 is a schematic structural diagram of a terminal according to an embodiment of this disclosure.

FIG. 2 is a schematic structural diagram of a video motion estimation device, such as the terminal 400 shown in FIG. 1, according to an embodiment of this disclosure. A terminal 400 shown in FIG. 2 includes: at least one processor 410 (including processing circuitry), a memory 450 (including a non-transitory computer-readable storage medium), at least one network interface 420, and a user interface 430. All the components in the terminal 400 are coupled together by a bus system 440. It may be understood that, the bus system 440 is configured to implement connection and communication between the components. In addition to a data bus, the bus system 440 further includes a power bus, a control bus, and a state signal bus. However, for clear description, all types of buses in FIG. 2 are classified as the bus system 440.

The processor 410 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any other processor, or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 may include one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this disclosure is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, wireless compatible authentication (Wi-Fi), a universal serial bus (USB), and the like.

A display module 453 is configured to display information by using one or more output apparatuses 431 (for example, a display screen or a speaker) associated with the user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the apparatus provided in the embodiments of this disclosure may be implemented in the form of software. FIG. 2 shows a video motion estimation apparatus 455 that is stored in the memory 450, which may be software in the form of a program, a plug-in, or the like, and include the following software modules: a first obtaining module 4551, a feature extraction module 4552, a first determining module 4553, a second determining module 4554 and a motion estimation module 4555. These modules are logical modules, and may be randomly combined or further divided based on a function to be performed.

The following describes functions of the modules.

In some embodiments, the apparatus provided in this embodiment of the disclosure may be implemented by using hardware. For example, the apparatus provided in this embodiment of the disclosure may be a processor in a form of a hardware decoding processor, programmed to perform the video motion estimation method provided in the embodiments of the disclosure. For example, the processor in the form of the hardware decoding processor may use one or more application-specific integrated circuits (ASIC), a DSP, a programmable logic device (PLD), a complex programmable logic device (CPLD), a field-programmable gate array (FPGA), or other electronic components.

Figure 3:
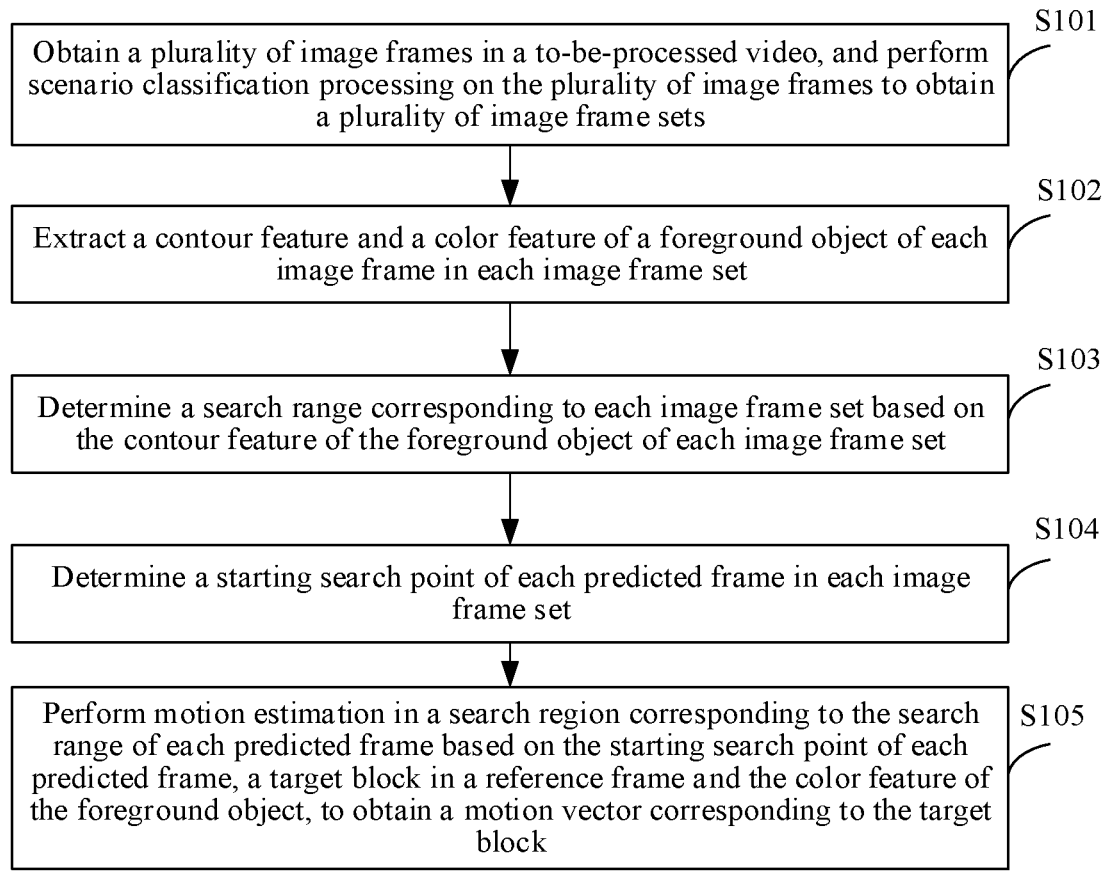
FIG. 3 is a schematic flowchart of an implementation of a video motion estimation method according to an embodiment of this disclosure.

The video motion estimation method provided in the embodiments of the disclosure is described with reference to an exemplary application and implementation of the terminal 400 provided in this embodiment of the disclosure. FIG. 3 is a schematic flowchart of an implementation of a video motion estimation method according to an embodiment of this disclosure, and steps shown in FIG. 3 are combined for description.

S101: Obtain a plurality of image frames in a to-be-processed video, and perform scenario classification processing on the plurality of image frames to obtain a plurality of image frame sets. For example, each image frame set is associated with a corresponding scenario and includes plural image frames.

The to-be-processed video may be a video recorded in real time by a terminal, a video locally stored by the terminal, or a video downloaded from a server by the terminal.

Step 101 may be implemented by performing scenario classification processing based on background image regions of the image frames. When the background images of a plurality of the image frames are similar, the plurality of image frames may be determined in the same scenario. For example, if a video is a holiday show including a plurality of different programs, backgrounds of the different programs may be different, so that each program may be classified as one scenario. Each scenario corresponds to an image frame set and each image frame set includes at least one image frame.

In some embodiments, one image frame set may be understood as one 3D image block, and three dimensions of the 3D image block are frame number, frame width, and frame height respectively, where the frame number is the number of an image frame included in the image frame set, the frame width is the width of an image frame, which may be represented through the number of a pixel point in a width direction during an actual implementation, and the frame height is the height of an image frame, which may be represented through the number of a pixel point in a height direction.

S102: Extract a contour feature and a color feature of a foreground object of each image frame in each image frame set.

The contour feature of the foreground object may be calculated and collected through an optical flow vector gradient of an optical flow field, and the color feature of the foreground object may be extracted according to an image region where the foreground object is located.

In some embodiments, priori knowledge of the background structure of continuous sample image frames and foreground priori regions of the sample image frames may be used for training an image segmentation model. By using the image segmentation model obtained after training, a segmentation of the foreground object and an estimation of the scenario classification may be implemented, and the color feature of the image region of the foreground object obtained through segmentation may be extracted. The color features of the image frames in one image frame set forms a color feature sequence.

In some embodiments, a scenario classification process in step S101 and an extraction process of the contour feature and the contour feature of the foreground object in step S102 may be inputting the to-be-processed video into the image segmentation model obtained after training, so as to complete the scenario classification and feature extraction of the plurality of image frames in the to-be-processed video.

S103: Determine a search range corresponding to each image frame set based on the contour feature of the foreground object of each image frame set. For example, a search range corresponding to each image frame set is determined based on the contour feature of the foreground object of the image frames in each image frame set.

The contour of the foreground object may be represented by a rectangle, a square, an irregular figure, or the like, and the contour feature of the foreground object may include the coordinates of a contour vertex. Step S103 may be implemented by determining the search range that includes the foreground object in all image frames through the coordinates of the contour vertex of the foreground object in each image frame in the image frame set.

S104: Determine a starting search point of each predicted frame in each image frame set. For example, each image frame set includes at least one predicted frame and at least one reference frame.

In each image frame set, a plurality of image frames included in the image frame set may be sorted in sequence by the time thereof, the first image frame is used as a reference frame, and the other image frames are used as predicted frames; or the i image frame may be used as a reference frame, and the i+1 image frame may be used as a predicted frame, where i is an increasing positive integer. The reference frame is an image frame used as a reference for calculating a motion vector in the image frame set, and the predicted frame is an image frame used for calculating the motion vector in the image frame set.

S104 may be implemented by predicting the motion vector of the target block in each predicted frame through using median prediction, uplayer prediction, and origin point prediction of a spatial domain successively based on a correlation of a video sequence frame in the spatial domain and a temporal domain, so as to determine a location of the starting search point of each predicted frame.

S105: Perform motion estimation processing in a search region corresponding to the search range of each predicted frame based on the starting search point of each predicted frame, a target block in a reference frame and the color feature of the foreground object, to obtain a motion vector corresponding to the target block. For example, for each image frame set, motion estimation processing is performed in a search region corresponding to the search range of each predicted frame in the respective image frame set based on the starting search point of the respective predicted frame, a reference block in the at least one reference frame of the respective image frame set, and the color feature of the foreground object, to obtain a motion vector corresponding to the reference block.

Based on a reference target block (a target block in the reference frame) in the reference frame, during searching for a target block matching the reference target block from each predicted frame, bidirectional motion estimation calculation may be performed by using each starting search point in each predicted frame as a center with the search region corresponding to the search range and the color feature of the foreground object as restriction. Using the starting search point as the center, the searching of the target block of the predicted frame remains to be completed in the search region. For example, an asymmetric cross search template with the number of a w-axis search point being twice the number of a h-axis search point may be used for determining whether a foreground motion in a slider P is a horizontal motion or a vertical motion according to the magnitude of a predicted vector on the w-axis and h-axis. If a horizontal motion is determined, the asymmetric cross search template in a horizontal direction of an original UMHexagonS template is used. If a vertical motion is determined, a template with the number of a h-axis search point being twice the number of an x-axis search point is used for searching. As a result, the target block in the predicted frame is determined, and then the motion vector corresponding to the target block is determined based on location information of the target block and the reference target block.

In the video motion estimation method provided by the embodiments of this disclosure, after the plurality of image frames in the to-be-processed video are obtained, scenario classification processing is performed on the plurality of image frames first to obtain a plurality of image frame sets, that is, each scenario corresponds to one image frame set and each image frame set includes one or more image frames. Image frames belonging to the same scenario have similar backgrounds. The contour feature and color feature of the foreground object of each image frame in each image frame set are extracted, the search range corresponding to each image frame set is determined based on the contour feature of the foreground object in each image frame set, and then each starting search point corresponding to each predicted frame in each image frame set is determined, so that the motion estimation is performed in the search region corresponding to the search range of each predicted frame based on each starting search point, the target block in the reference frame and the color feature of the foreground object. The motion vector corresponding to the target block is obtained, and the searching is performed in a certain range in the embodiment of this disclosure. The searching is performed in a certain range in the embodiment of this disclosure, so that the search range is narrowed down so as to reduce search time, and the search range is limited based on the contour feature of the foreground object in each scenario, thereby improving accuracy of the motion estimation.

In some embodiments, the foregoing step S101 of performing scenario classification processing on the plurality of image frames to obtain a plurality of image frame sets may be implemented through the following manners: performing the following processing for any image frame in any of the image frame sets: determining a background image region of the plurality of image frames and determining image similarity between a plurality of the background image regions; and performing scenario classification processing on the plurality of image frames to obtain the plurality of image frame sets based on the image similarity between the plurality of the background image frame regions.

During an implementation of the determining a background image region of the plurality of image frames and determining image similarity between a plurality of the background image regions, a target detection may be performed first to recognize the foreground object of the plurality of image frames. For example, detection and extraction of the foreground object may be performed by using a difference between two or more consecutive frames of images in a video sequence. By using time information, a gray scale difference value of a corresponding pixel point is obtained by comparing several consecutive frames in an image. If all the grayscale difference values are greater than a certain threshold, a foreground object may be determined to be at this location, and other regions outside this location are also a background image region.

In some embodiments, an optical flow field method may be used to detect the foreground object. During an implementation, related foreground object can be better detected from the image frames by using a gray scale preservation principle of corresponding pixels in two adjacent frames to evaluate the change of a two-dimensional image. The optical flow field method is applicable to detection of a moving foreground object during movement of a camera.

After the background image regions are obtained, the image similarity between the background image regions may be calculated. During an implementation, a histogram matching algorithm may be used for calculating the image similarity between the background image regions. For example, there is a background image region A and a background image region B, the histograms of the two images are calculated respectively, namely HistA, HistB, and then a normalized correlation coefficient (such as a Barthel distance and a histogram intersection distance) of the two histograms and the like are calculated, so as to determine the similarity between the two images. In some embodiments, image similarity calculation may alternatively be performed based on a feature point. During an implementation, the feature points in the background image regions may be extracted respectively, and a Hamming distance between the feature points may be calculated, so as to determine a value of the similarity between the background image regions.

After the image similarity between the plurality of background image regions is calculated, when classifying the plurality of image frames as scenarios, based on the time information of each image frame, the image frames corresponding to the background image regions with consecutive time and high similarity are classified as one image frame set.

In the foregoing embodiment, the plurality of image frames in the video are classified as scenarios through the background images. Since the motion range of the foreground object in the same scenario is relatively small, the search range of the foreground object can be determined based on the scenario. The search range is as small as possible while maintaining accuracy.

In some embodiments, the step S102 of extracting a contour feature and a color feature of a foreground object of each image frame in each image frame set shown in FIG. 3 may be implemented through the following manners: performing the following processing for any image frame in any of the image frame sets: determining a foreground image region where the foreground object in the image frame is located; using location information of the foreground image region as the contour feature of the foreground object in the image frame; and obtaining the color feature of the foreground object in the image frame based on performing color extraction processing on the foreground image region.

During obtaining the background image region, the foreground and background of the image frame are segmented, so that the background image region, the foreground image region where the foreground object is located, and the location information of the foreground image region can be determined.

In this embodiment of this disclosure, the contour of the foreground image region may not completely fit the foreground object. For example, when the foreground object is a person, the contour of the foreground image region may be a rectangle or a square that can include the person, which does not have to be a contour of a human shape. Therefore, the location information of the foreground image region may be represented by vertex coordinates in the contour of the foreground object, that is, the contour feature of the foreground object includes the coordinates of each vertex of the foreground image region.

The color feature of the foreground object may alternatively be understood as a hue feature of the foreground object. The hue feature is a visual feature applied to image retrieval, and the hue is often closely related to an object or scenario included in an image. In addition, compared with other visual features, the hue feature has less dependence on the size, orientation, and viewing angle of the image itself, so that the hue feature has higher robustness.

In an actual implementation, the hue feature may be represented in various methods, such as a hue histogram, a hue moment, a hue set, a hue aggregation vector, and a hue correlation diagram.

In the foregoing embodiment, the contour feature and color feature of the foreground object of each image frame in each image frame set can be extracted, so as to provide a data basis for setting the search range and setting a restriction of the motion estimation during block matching with the reference target block (reference block) in the predicted frame.

Figure 4A:
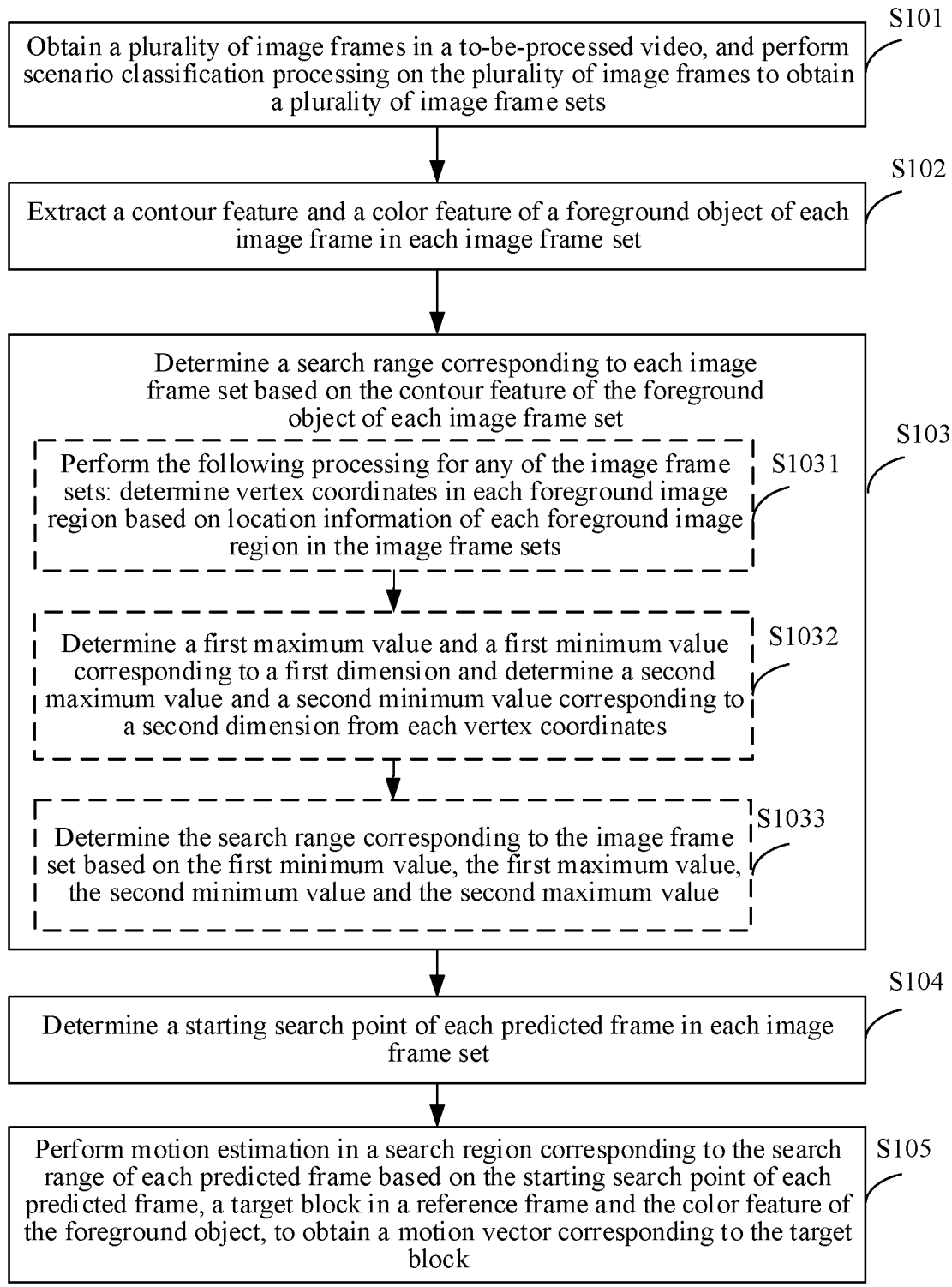
FIG. 4A to FIG. 4C are schematic flowcharts of an implementation of performing motion estimation in a search region corresponding to a search range according to an embodiment of this disclosure.

As shown in FIG. 4A, the step S103 of determining a search range corresponding to each image frame set based on the contour feature of the foreground object of each image frame set shown in FIG. 3 may be implemented through the following steps:

S1031: Perform the following processing for any of the image frame sets: determine vertex coordinates in each foreground image region based on location information of each foreground image region in the image frame sets.

The location information of the foreground image region may be represented by the vertex coordinates of the foreground image region. For example, when the foreground image region is a rectangular region, the coordinates of four vertices of the rectangular region need to be determined. Assuming that the coordinates of the four vertices A, B, C, and D of the foreground image region in a predicted frame are (100, 100), (100, 500), (300, 500), and (300, 100), respectively.

S1032: Determine a first maximum value and a first minimum value corresponding to a first dimension and determining a second maximum value and a second minimum value corresponding to a second dimension from each vertex coordinates.

The first dimension and the second dimension are different. For example, the first dimension may be width, and the second dimension may be height. Step S1032 is implemented by determining the first maximum value and the first minimum value corresponding to the first dimension and determining the second maximum value and the second minimum value corresponding to the second dimension from each vertex coordinates of each foreground image region in the same image frame set.

For example, if an image frame set includes 100 image frames, and the foreground image region in each image frame is a rectangular region, then when step S1032 is implemented, the first maximum value and first minimum value of the first dimension and the second maximum and second minimum value of the second dimension are determined from 400 vertex coordinates.

S1033: Determine the search range corresponding to the image frame set based on the first minimum value, the first maximum value, the second minimum value and the second maximum value.

After the first minimum value, the first maximum value, the second minimum value and the second maximum value are determined, the search range corresponding to the image frame set can be determined, that is, the search range in the first dimension is greater than or equal to the first minimum value, and is less than or equal to the first maximum value, and the search range in the second dimension is greater than or equal to the second minimum value, and is less than or equal to the second maximum value. For example, four vertex coordinates may be determined by using these four values, namely (the first minimum value, the second minimum value), (the first minimum value, the second maximum value), (the first maximum value, the second minimum value) and (the first maximum value, the second maximum value), and the search range corresponding to the image frame set is determined based on these four vertex coordinates.

For example, the first minimum value is 100, the first maximum value is 600, the second minimum value is 100, and the second maximum value is 800, then the four vertex coordinates determined based on the four values are (100, 100), (100, 800), (600, 100) and (600, 800) respectively. Therefore, the search range is alternatively a rectangular region determined by the four vertices.

Through the foregoing steps S1031 to S1033, the search region is determined based on the contour feature of the foreground object in the plurality of image frames belonging to the same scenario. Since the motion range of the foreground object in the same scenario is generally relatively small, the search range determined by the maximum coordinates and the minimum coordinates in two dimensions in a plurality of foreground image regions can ensure that the foreground object in all image frames in the scenario are included, thereby ensuring the calculation accuracy of motion estimation.

In some embodiments, the step S104 of determining a starting search point of each predicted frame in each image frame set shown in FIG. 3 may be implemented by the following methods: determining location information of a reference target block in each reference frame in each image frame set, the reference target block being any of the target blocks in the reference frame; obtaining a predicted motion vector of each predicted frame through predicting the motion vector of each predicted frame in a set prediction mode, the prediction mode including at least one of the following: a median prediction mode, a uplayer prediction mode, and an origin point prediction mode; and determining the starting search point of each predicted frame based on the location information of the reference target block and the predicted motion vector.

For the reference frame, the foreground and background are also segmented. After the foreground image region in the reference frame is determined, the foreground image region may be segmented to obtain a plurality of reference target blocks. The size of the reference target block may be 4*4, 8*8, or the like, and the location information of the reference target block is represented by one vertex coordinates of the reference target block, for example, the vertex coordinates on the upper left corner of the reference target block.

The prediction mode includes at least one of the median prediction mode, the uplayer prediction mode, and the origin point prediction mode.

Due to the integrity of a moving object and the continuity of a video motion, the motion of the video must be correlated in time and space. Because of the existence of correlation between adjacent blocks, the motion vector of a current block can be predicted by the motion vectors of the adjacent blocks. During an implementation, an initial motion vector of the current block may be predicted according to the motion vector of the adjacent block (median prediction) of the current block in a spatial location or the motion vector of the block (origin point prediction) in the same location in a previous frame image in time, so as to determine an initial search point.

During implementing the scheme of determining the starting search point of each predicted frame based on the location information of the reference target block and the predicted motion vector, the location information of the reference target block can be moved according to the predicted motion vector, so as to determine each starting search point of each predicted frame.

A high-precision starting search point can make the search point as close as possible to the target block in the predicted frame, so that the search speed can be improved. In the foregoing embodiment, the current motion vector is predicted by at least one prediction mode among the median prediction, the uplayer prediction and the origin point prediction based on the correlation between a video sequence frame in a spatial domain and a temporal domain, so as to determine the location of an optimal starting search point and ensure the accuracy of the starting search point.

Figure 4B:
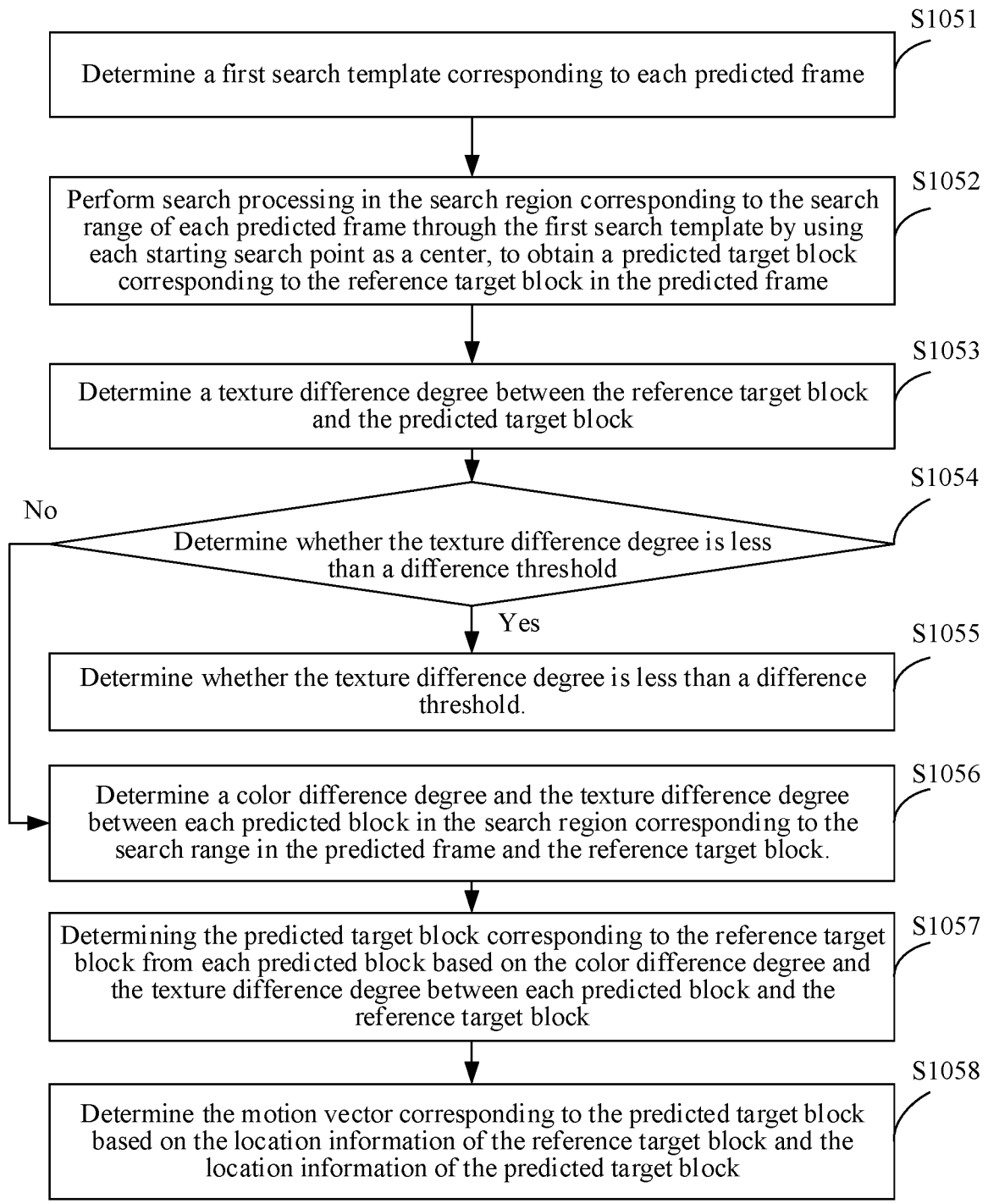

In some embodiments, the step S105 of performing motion estimation processing in a search region corresponding to the search range of each predicted frame based on the starting search point of each predicted frame, a target block in a reference frame and the color feature of the foreground object, to obtain a motion vector corresponding to the target block shown in FIG. 3 may be implemented by steps S1051 to S1058 shown in FIG. 4B, and each step is described with reference to FIG. 4B in the following.

S1051: Determine a first search template corresponding to each predicted frame.

The first search template may be an asymmetric cross template, a hexagonal template, a diamond template, or the like. The first search template may be determined according to a predicted motion direction of the foreground object.

In some embodiments, the foregoing step S1051 may be implemented in the following manners: determining a first motion direction of the foreground object in the predicted frame based on a predicted motion vector of the predicted target block in each predicted frame; and determining the first search template corresponding to each predicted frame based on the first motion direction of the foreground object.

The first motion direction may be a horizontal direction, a vertical direction, or an oblique direction.

In some embodiments, during predicting the first motion direction of the foreground object, the first motion direction may alternatively be determined based on the motion direction of a previous frame of the predicted frame relative to the reference frame. For example, the motion direction of the previous frame of the predicted frame relative to the reference frame may be determined as the first motion direction of the foreground object.

S1052: Perform search processing in the search region corresponding to the search range of each predicted frame through the first search template by using each starting search point as a center, to obtain a predicted target block corresponding to the reference target block in the predicted frame.

Step S1052 may be implemented by performing search processing in the search region corresponding to the search range in the predicted frame through the first search template by using the starting search point as a center, to determine each candidate target block, and then perform matching between the candidate target blocks and the reference target block, so as to determine the predicted target block that corresponds to the reference target block.

In the embodiment of this disclosure, in order to make full use of the restriction of the color feature on the motion estimation, on the basis of a motion estimation objective function, restrictions of the color feature are added, that is, SADcolor represents a bidirectional motion estimation function of the color feature, and SADobj represents a bidirectional motion estimation function of the foreground object target sequence. $\lambda 1$ and $\lambda 2$ are weight factors of the color feature and the foreground object target sequence respectively, and the weight factors can be dynamically adjusted by a ratio of two sequence features in a preprocessing stage. Therefore, the motion estimation objective function SAD in this embodiment of this disclosure may be represented as SAD=$\lambda 1$SADcolor+$\lambda 2$SADobj.

S1053: Determine a texture difference degree between the reference target block and the predicted target block.

Step S1053 may be implemented by extracting the texture features between the reference target block and the predicted target block, and then determining texture difference degree values between the reference target block and the predicted target block with reference to the texture features between the reference target block and the predicted target block.

S1054: Determine whether the texture difference degree is less than a difference threshold.

When the texture difference degree is less than a preset difference threshold, the texture difference between the reference target block and the predicted target block is relatively small, so that the predicted target block is considered to be a correct target block, and the process goes to step S1055; and when the texture difference degree is greater than or equal to the difference threshold, the texture difference between the reference target block and the predicted target block is relatively large, so that the predicted target block is considered to be a wrong target block, and the process goes to step S1056.

S1055: Determine the motion vector corresponding to the predicted target block based on the location information of the reference target block and the location information of the predicted target block.

The motion vector corresponding to the predicted target block may be determined after the location information of the reference target block and the location information of the predicted target block are obtained. During an implementation, the two vertex coordinates used for representing the location information may be subtracted, that is, the vertex coordinates of the reference target block are subtracted from the vertex coordinates of the predicted target block, and the motion vector corresponding to the predicted target block may be obtained.

S1056: Determine the color difference degree and the texture difference degree between each predicted block in the search region corresponding to the search range in the predicted frame and the reference target block.

When the texture difference between the predicted target block and the reference target block is relatively large, the color difference degree and the texture difference degree between each predicted block and the reference target block may be sequentially determined from the search region.

S1057: Determine the predicted target block corresponding to the reference target block from each predicted block based on the color difference degree and the texture difference degree between each predicted block and the reference target block.

Step S1057 may be implemented by selecting a predicted block that color difference degree between the predicted block and the reference target block is less than a color threshold, and the texture difference degree is less than a difference threshold. When there is a predicted block that the color difference between the predicted block and the reference target block is smaller than the color threshold and the texture difference degree is smaller than the difference threshold, the predicted block with the smallest difference is determined as the predicted target block.

S1058: Determine the motion vector corresponding to the predicted target block based on the location information of the reference target block and the location information of the predicted target block.

In the above steps S1051 to S1058, after each search template is determined, the search template is used to search for the predicted target block that matches the reference target block in the reference frame in the search region of the predicted frame with the starting search point as the center. In addition, the texture difference degree between the predicted target block and the reference target block needs to be compared with the difference threshold. When the texture difference degree is less than the difference threshold, it is considered that a correct predicted target block is matched, and when the texture difference degree is greater than or equal to the difference threshold, it is considered that a correct predicted target block is not matched, then each predicted block in the search region in the predicted frame can be traversed in this case, and the correct predicted target block can be determined from it, so as to ensure the correctness of the predicted target block, thereby improving the accuracy of motion estimation.

Figure 4C:
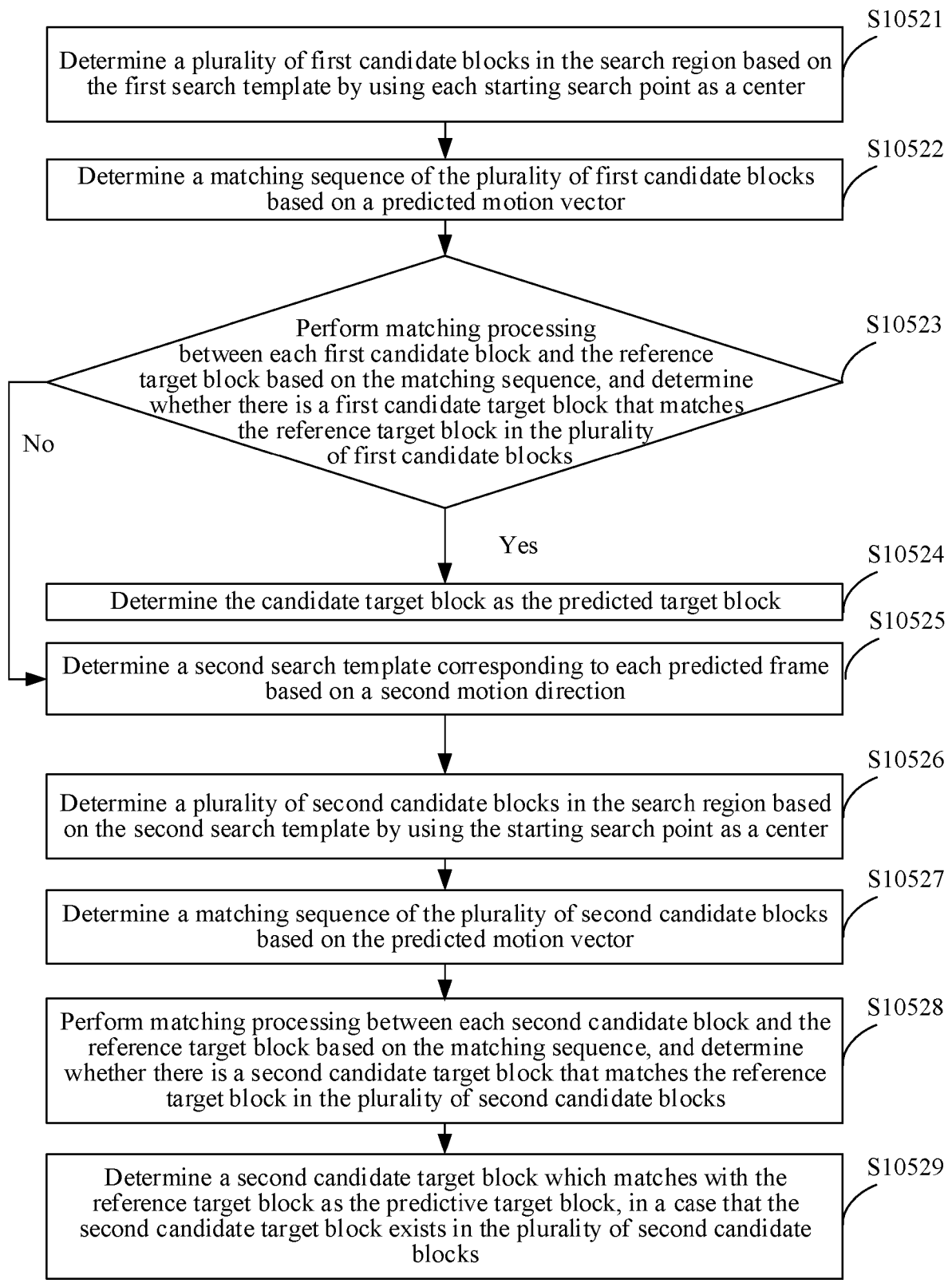

In an actual implementation process, as shown in FIG. 4C, step S1052 may be implemented by the following steps:

S10521: Determine a plurality of first candidate blocks in the search region based on the first search template by using each starting search point as a center.

Taking the first search template as an asymmetric cross template in a horizontal direction, with six blocks in the horizontal direction and three blocks in a vertical direction as an example for description. Step S10521 may be implemented by using the starting search point as the center, and determining the three predicted blocks at the top and bottom of the starting search point and six adjacent predicted blocks at the left and right as the first candidate blocks.

S10522: Determine a matching sequence of the plurality of first candidate blocks based on the predicted motion vector;

Step S1052 may be implemented by determining the matching sequence of the plurality of candidate blocks based on the region in which the predicted motion vector falls, or determining the matching sequence of the plurality of candidate blocks according to a distance between the predicted motion vector and each candidate block. In the above example, for example, the predicted motion vector is in a horizontal left direction, then the 6 candidate blocks on the left side of the starting search point may be preferentially matched.

S10523: Perform matching processing between each first candidate block and the reference target block based on the matching sequence, and determine whether there is a first candidate target block that matches the reference target block in the plurality of first candidate blocks.

When there is a first candidate target block that matches the reference target block in the plurality of first candidate blocks, the process goes to step S10524; and when there is no candidate target block matching the reference target block among the plurality of first candidate blocks, the process goes to step S10525.

In some embodiments, when there is no first candidate target block matching the reference target block among the plurality of first candidate blocks, each predicted block in the search region in the predicted frame may alternatively be directly traversed, so as to determine the predicted target block.

S10524: Determine the candidate target block as the predicted target block.

S10525: Determine the second search template corresponding to each predicted frame based on the second motion direction.

The second motion direction is different from the first motion direction. If the first search template determined based on the first motion direction does not match the predicted target block, the prediction of the first motion direction is wrong. In this case, the second search template may be determined according to the second motion direction, and the searching of predicted target block is performed again.

S10526: Determine a plurality of second candidate blocks in the search region based on the second search template by using the starting search point as a center.

S10527: Determine a matching sequence of the plurality of second candidate blocks based on the predicted motion vector.

S10528: Perform matching processing on each second candidate block and the reference target block based on the matching sequence, and determine whether there is a second candidate target block that matches the reference target block in the plurality of second candidate blocks.

S10529: Determine a second candidate target block which matches with the reference target block as the predicted target block, in a case that the second candidate target block exists in the plurality of second candidate blocks.

The implementation process of steps S10526 to S10529 is similar to that of steps S10521 to S10524. Through the foregoing steps S10521 to S10529, the search template can be determined by the predicted motion direction of the foreground object, and the candidate for priority matching can be determined by the predicted motion vector, so as to match the candidate block with the reference target block. When the predicted target block is not matched by the search template, the search template can be re-determined based on the motion direction different from the predicted motion direction of the foreground object to search for the predicted target block, so as to increase the matching speed, thereby improving the processing efficiency of motion estimation.

Figure 5:
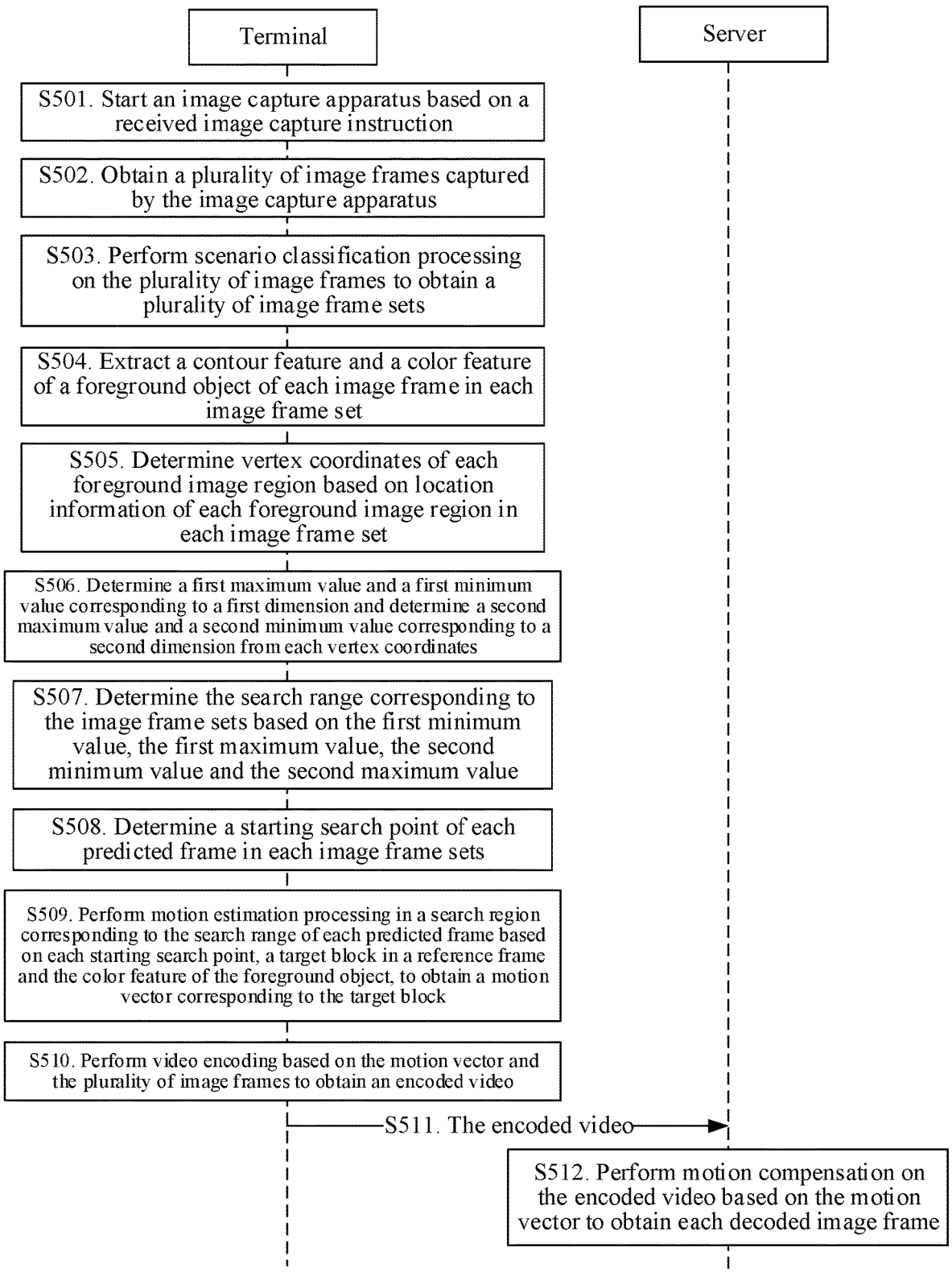
FIG. 5 is another schematic flowchart of a video motion estimation method according to an embodiment of this disclosure.

Based on the foregoing embodiments, an embodiment of this disclosure further provides a video motion estimation method, applicable to the network architecture shown in FIG. 1. FIG. 5 is a schematic diagram of an implementation of a video motion estimation method according to an embodiment of this disclosure. As shown in FIG. 5, the method includes the following steps:

S501: The terminal starts the image capture apparatus based on the received image capture instruction.

The image capture instruction may be an operation instruction instructing to capture a video, and the image capture instruction may be triggered by an instant messaging application, or may alternatively be triggered by an office application, or may be triggered by a short video application.

S502: The terminal obtains a plurality of image frames captured by the image capture apparatus.

After being started, the image capture apparatus performs image capture to obtain a plurality of image frames.

S503: The terminal performs scenario classification processing on the plurality of image frames to obtain a plurality of image frame sets.

The terminal may perform scenario segmentation on a plurality of image frames by combining the optical flow field and the geometric scenario classification method based on scenario structure estimation, so as to obtain a plurality of image frame sets, and each image frame set includes at least one image frame.

S504: The terminal extracts a contour feature and a color feature of a foreground object of each image frame in each image frame set.

S505: The terminal determines vertex coordinates in each foreground image region based on the location information of each foreground image region in the image frame sets.

S506: The terminal determines a first maximum value and a first minimum value corresponding to a first dimension and determining a second maximum value and a second minimum value corresponding to a second dimension from each vertex coordinates.

S507: The terminal determines the search range corresponding to the image frame sets based on the first minimum value, the first maximum value, the second minimum value and the second maximum value.

S508: The terminal determines a starting search point of each predicted frame in each image frame set.

S509: The terminal performs motion estimation processing in a search region corresponding to the search range of each predicted frame based on each starting search point, a target block in a reference frame and the color feature of the foreground object, to obtain a motion vector corresponding to the target block.

S510: The terminal performs video encoding based on the motion vector and the plurality of image frames to obtain an encoded video.

S511: The terminal sends the encoded video to a server.

The server may be a service server corresponding to an application that triggers an image capture instruction, such as an instant messaging server, an office application server, or a short video server.

S512: The server performs motion compensation on the encoded video based on the motion vector to obtain each decoded image frame.

In the video motion estimation method provided by the embodiments of this disclosure, after the plurality of image frames in the to-be-processed video are obtained, scenario classification processing is performed on the plurality of image frames first to obtain a plurality of image frame sets, that is, each scenario corresponds to one image frame set and each image frame set includes one or more image frames. Image frames belonging to the same scenario have similar backgrounds. The contour feature and color feature of the foreground object of each image frame in each image frame set are extracted, the search range corresponding to each image frame set is determined through the maximum value and minimum value of the coordinates determined based on the vertex coordinates of the contour of the foreground object in each image frame set, and then each starting search point corresponding to each predicted frame in each image frame set is determined, so that the motion estimation is performed in the search region corresponding to the search range of each predicted frame based on each starting search point, the target block in the reference frame and the color feature of the foreground object. The motion vector corresponding to the target block is obtained. Since the search range is determined based on the vertex coordinates of the contour, the search range can be ensured to be as small as possible under the premise of including the foreground object, so as to reduce search time and ensure accuracy of the motion estimation. After that, the terminal sends the reference frame and the motion vector to the server, which can reduce the data bandwidth requirement, reduce the transmission delay, and improve the transmission efficiency.

The following describes an exemplary application of this embodiment of this disclosure in an actual application scenario.

The embodiment of this disclosure can be applied to a video application such as a video storage application, an instant messaging application, a video playback application, a video calling application, and a live broadcast application. Taking an instant messaging application as an example, and the instant messaging application runs on a video terminal. A video terminal obtains a to-be-processed video (such as a recorded video), searches for the target block corresponding to the reference frame in the search region corresponding to the search range to determine the motion vector, encodes the video based on the motion vector, and sends the encoded video to the server. The server sends the encoded video to a video receiver, and the video receiver decodes the received encoded video to play the video, thereby improving the efficiency of video transmission. Taking a video storage application as an example, and the video storage application runs on a terminal. The terminal obtains a to-be-processed video (such as a video recorded in real time), searches the target block corresponding to the reference frame in the search region corresponding to the search range to determine the motion vector, encodes the video based on the motion vector, and sends the encoded video to the server to implement a cloud storage solution, thereby saving storage space. The video motion estimation method provided in the embodiments of this disclosure is described below combined with a video scenario.

Figure 6:
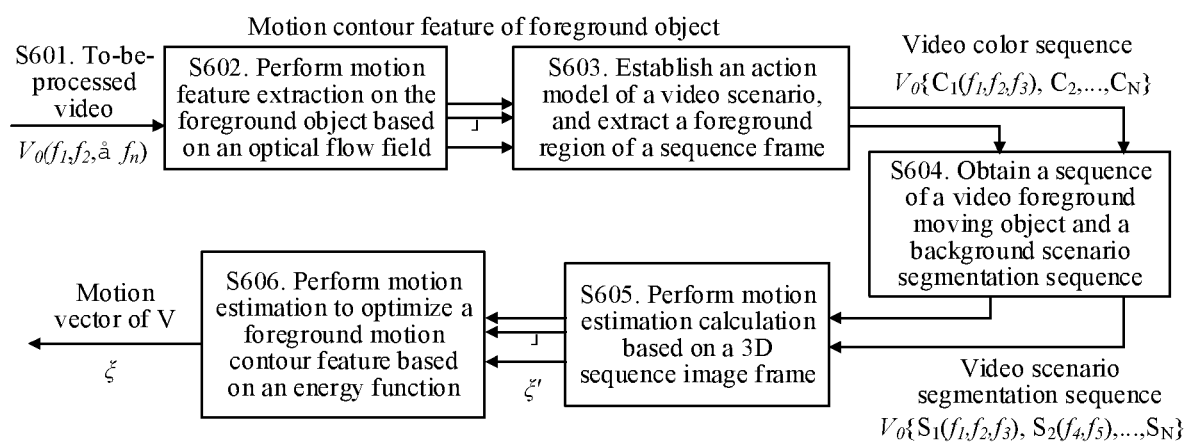
FIG. 6 is a schematic flowchart of an implementation of a video motion estimation method based on a 3D image block according to an embodiment of this disclosure.

FIG. 6 is a schematic flowchart of an implementation of a video motion estimation method based on a 3D image block according to an embodiment of this disclosure. As shown in FIG. 6, the following steps are included.

S601: Initialize and define a to-be-processed video.

During an implementation, video sequence data Vo (f1, f2, . . . , fn) may be defined as a three-dimensional space cuboid of F*W*H, where F, W, and H are frame number of Vo in a temporal domain, frame width and frame height of Vo in a spatial domain respectively. A three-dimensional cuboid slider P (P E Vo) whose length, width, and height are f, w, and h respectively is set in Vo, and an initial location point of P in Vo is set as O (0,0,0), where the initial location point O is an initial location of the boundary of Vo.

S602: Perform motion feature extraction on the foreground object based on an optical flow field, to obtain a motion contour feature of the foreground object.

Considering that an image segmentation method based on video object segmentation is easily affected by complex environment, lens movement, illumination instability, and the like, in this embodiment of this disclosure, a global optical flow (such as a Horn-Schunck optical flow) and the image segmentation are combined to process the foreground of the video. Step S602 may be implemented by calculating and collecting the motion contour feature of the foreground object through an optical flow vector gradient of an optical flow field.

Step S603: Establish an action model of the video scenario, and extract the foreground region of the sequence frame.

The optical flow field and a geometric scenario segmentation method based on scenario structure estimation are combined to perform video segmentation on Vo of the video, and the foreground object and a color sequence feature of a color block corresponding to the foreground object are extracted. An extraction and segmentation result and color information are used to constrain the matching process of each macroblock in the image.

For example, based on the motion information of the foreground object of the video in Horn-Schunck optical flow field and the prior knowledge of the background structure of consecutive frames, and combined with a foreground prior region, the action model of the video scenario is established, and the prior knowledge of a foreground region in consecutive image frames is extracted. Then, by iterating a probability density function of consecutive frame pixels to find an extreme value, the pixels of the same type are classified to implement the segmentation of the scenario. In addition, the color sequence information of the images is extracted, and a segmentation result is improved based on the estimation and classification of the scenario structure.

In this way, the segmentation of the foreground object and the estimation of scenario classification are completed, and the color sequence information of the segmented image is extracted.

S604: Obtain a video foreground moving object sequence and a background segmentation sequence.

In some embodiments, in a video preprocessing stage of the foregoing steps S601 to S604, a neural network-based method may be used for implementing the extraction of foreground motion information of the video and segmentation of the video scenario.

S605: Perform motion estimation calculation based on a 3D sequence image frame.

The video foreground motion information and the features of the video sequence image frames of Vo in the three directions of F, W, and H are combined to set the value range of the side length of the slider P, a current motion vector is predicted and the location of the starting search point is determined. The initial location point O of the slider P in Vo is initialized according to the starting search point. During an actual implementation, the current motion vector may be predicted through using median prediction, uplayer prediction, and origin point prediction of the spatial domain successively based on a correlation of a video sequence frame in the spatial domain and the temporal domain, so as to determine a location of an optimal starting search point. The initial location point O of the slider P in Vo is set at a center location of the foreground motion region to which the determined location of the starting search point belongs in the three directions of f, w and h.

Taking the initial location point O as a center, the motion vector estimation is implemented through an improved UMHexagonS search template, under the constraints of the space, temporal domain and color sequence feature limited by P, and based on an idea of bidirectional motion estimation.

Figure 7:
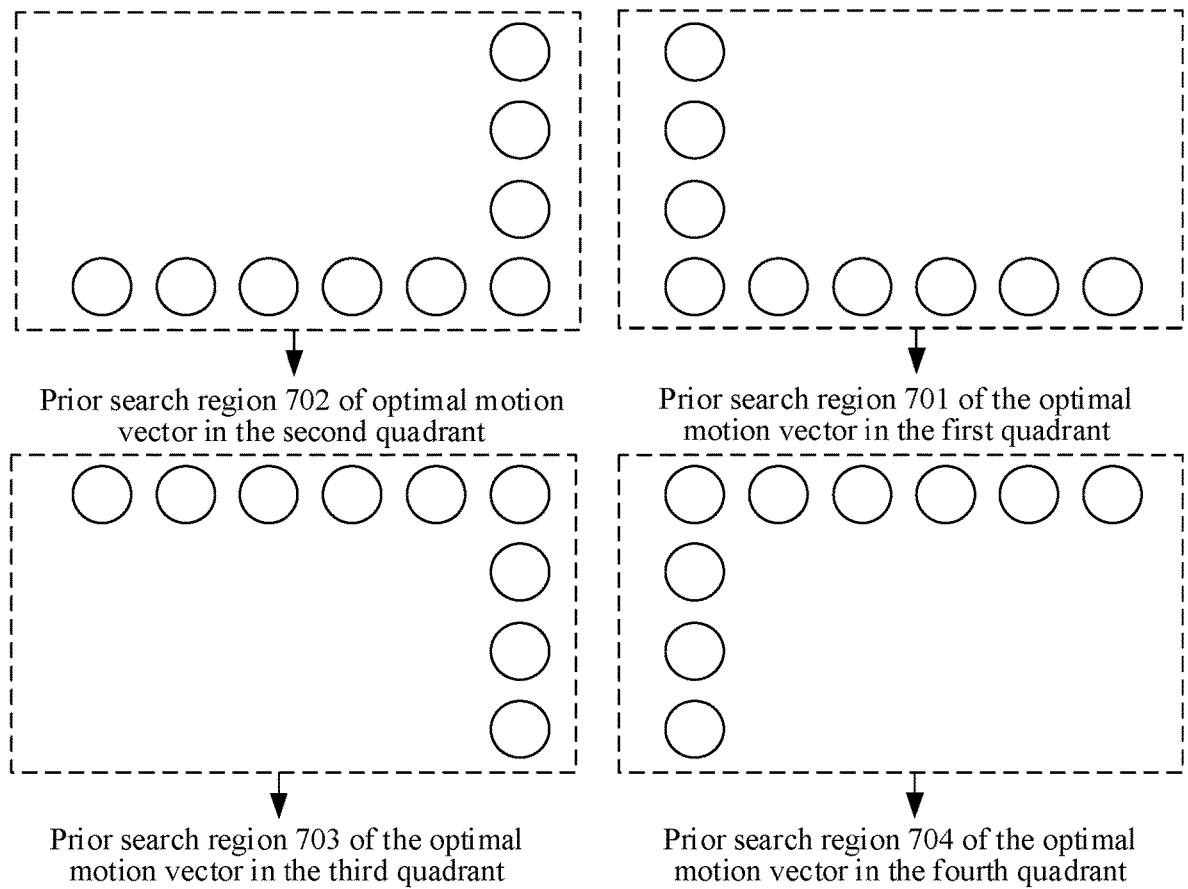
FIG. 7 is a schematic diagram corresponding to of a quadrant at which a predicted motion vector is located and a prior search region according to an embodiment of this disclosure.

For example, the bidirectional motion estimation calculation is performed with an edge location of the cuboid slider P, a segmentation scenario and a video color sequence feature as constraints. Taking the initial location point as a center, the searching of the target block of the current frame remains to be completed in P. An asymmetric cross search template with the number of a w-axis search point being twice the number of a h-axis search point may be used for determining whether a foreground motion in a slider P is a horizontal motion or a vertical motion according to the magnitude of the foregoing predicted vector on the w-axis and h-axis. If the foreground motion in the slider P is a horizontal motion, the horizontal asymmetric cross search template of an original UMHexagonS template is used. If the foreground motion in the slider P is a vertical motion, a template whose number of the h-axis search point is twice number of the w-axis search point is used. Different sub-regions are preferentially searched according to the region in which the predicted motion vector falls. As shown in FIG. 7, when the predicted motion vector falls into the first quadrant, the sub-region shown in 701 is preferentially searched; when the predicted motion vector falls into the second quadrant, the sub-region shown in 702 is preferentially searched; when the predicted motion vector falls into the third quadrant, the sub-region shown in 703 is preferentially searched; and when the predicted motion vector falls into the fourth quadrant, the sub-region shown in 704 is preferentially searched. As a result, the search time costs may be reduced, and a target macroblock precision rate may be improved, combining with the limitation of a scenario sequence feature of the video S606: Perform motion estimation optimization based on an energy function.

Considering that the color information of macroblocks at different locations in the image frame may be similar, wrong block matching is very likely to occur in the macroblock search of consecutive frames. The consistency of the scenario segmented image represents specific texture information of the video image frame, which can effectively determine the texture difference of two similar macroblocks, accurately track the motion information of each macroblock in the image frame, and correct a motion vector field of the image.

During an implementation, the calculation and estimation of the motion vector in step S605 may be constrained by a consistency energy function, and the consistency segmentation scheme may be used to determine whether the color sequence information of each segmented image is consistent, so as to detect and correct the mismatch of macroblocks, and improve the accuracy of the motion vector field.

The higher the similarity between macroblocks is, the smaller value of the consistency energy function is, whereas the lower the similarity between macroblocks is, the larger the value of the consistency energy function is. Therefore, during obtaining the optimal motion vector of the macroblock corresponding to the consecutive frames, the minimum value of the consistency energy function may be obtained, thereby optimizing the wrong motion vector and improving the motion estimation accuracy. In an actual implementation, in order to improve search efficiency, during determining the motion vector of the macroblock corresponding to the consecutive frames, or during determining that the function value of the consistency energy function is smaller than a preset threshold, that is, the macroblock corresponding to the reference frame has been considered to be found. In this case, the motion vector is determined based on the location information of the macroblock of the reference frame and the macroblock found in the current frame.

Considering that a macroblock-based motion estimation method mainly determines the optimal motion vector of a macroblock by obtaining the minimum absolute error between the macroblock corresponding to the reference frame and the macroblock corresponding to the current frame, the calculation is time-consuming and complicated, the accuracy of motion estimation is unstable especially for a video with a complex scenario, and the quick motion estimation method based on the foreground and background preprocessing of the video content may reduce the time of motion estimation, reduce the complexity of motion estimation, and improve the accuracy of the motion vector field, therefore, in the embodiment of this disclosure, combined with an unique structural feature of video sequence frame and the advantages and disadvantages of the macroblock-based motion estimation method, it is proposed to preprocess the video sequence image frame as a 3D overall calculation object and calculate the motion vector information of the video sequence image frame, so as to implement more efficient motion estimation and reduce video encoding time while ensuring a certain encoding rate-distortion performance.

Figure 8:
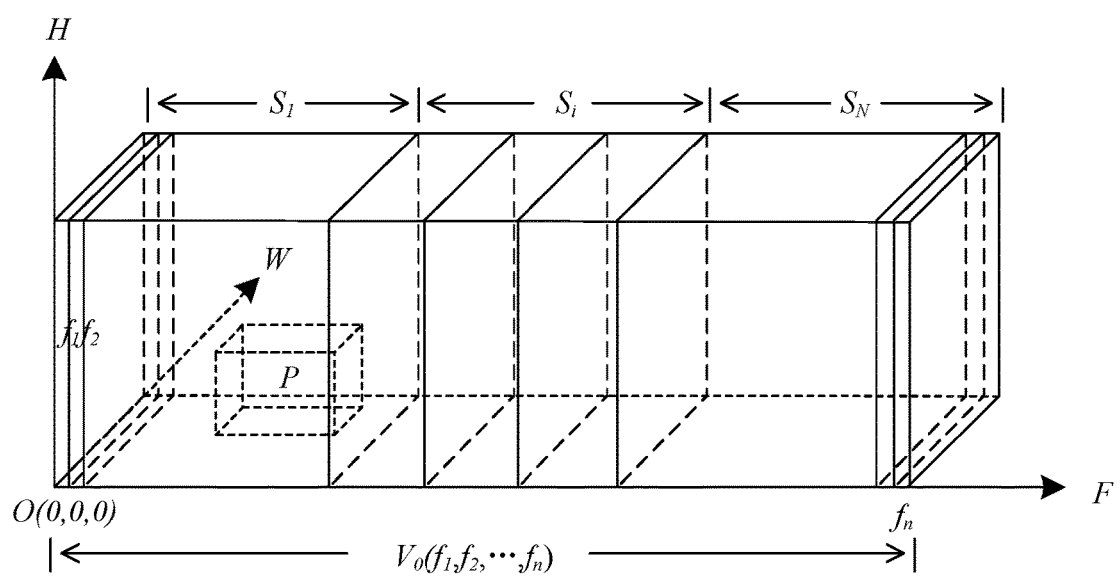
FIG. 8 is a schematic diagram of an implementation of motion estimation of a 3D image block according to an embodiment of this disclosure.

FIG. 8 is a schematic diagram of an implementation of motion estimation of a 3D image block according to an embodiment of this disclosure. As shown in FIG. 8, the 3D image set of a series of frames included in a video is taken as a F*W*H three-dimensional calculation object Vo (f1, f2, . . . , fn). After preprocessing Vo {S1 (f1, f . . . , fi−1), S2 (fi, fi+1, f . . . ), SN}, each scenario Si is listed as a search group. Vo is classified into N cuboid blocks according to the number of scenarios N, and the slider P traverses from the scenario Si of the first cuboid to the Nth cuboid SN in sequence until the motion estimation of Vo is completed. The values off, w, and h of the slider P in each scenario depend on the motion range of the moving foreground object in the three directions of the consecutive frames. From F=0, bidirectional motion estimation is performed, the search for the target block of the current frame for the current macroblock is completed and the corresponding motion vector is extracted through predicting the starting search point and according to the search template provided in the foregoing step S605. Each time a step of search is performed, the slider P slides along the search direction of the search template to ensure that the search range is limited in the 3D slider P, so that the motion feature of the foreground object can constrain the search range of the target matching macroblock and reduce the number of search points.

In addition, in order to make full use of the color sequence to constrain the motion estimation during the bidirectional motion estimation calculation in the embodiment of this disclosure, based on the original bidirectional motion estimation objective function, the constraint of the color sequence feature is added, that is, SADcolor is set to represent the bidirectional motion estimation function of the color sequence frame, SADobj represents the bidirectional motion estimation function of the foreground object target sequence, $\lambda 1$ and $\lambda 2$ are the weight factors of the color sequence and the foreground object target sequence respectively, and the weight factor can be dynamically adjusted by the ratio of the two sequence features in the preprocessing stage. Therefore, in the embodiment of this disclosure, the bidirectional motion estimation objective function SAD of Vo can be represented as SAD=$\lambda 1$SADcolor+$\lambda 2$SADobj.

In addition, considering that the color information of macroblocks at different locations in an actual video image frame is similar, during searching and matching the macroblock of the reference frame and the macroblock of the current frame, a situation of mismatching is likely to occur. The consistency energy function can be used for distinguishing the underlying texture differences of similar blocks, accurately tracking the motion information of the macroblock of the image frame, correcting wrong vector information, and improving the extraction accuracy of the motion vector field.

For the problems, such as, the video motion estimation method is time-consuming and computationally complex, resulting in excessively long video encoding time, and blurring and a block effect in the obtained interpolated frames, the embodiment of this disclosure proposes an efficient video quick motion estimation method based on a 3D image block. This method is differentiated from other methods because: the preprocessing of video content is applied to motion estimation, making full use of the foreground motion information of consecutive frames and the scenario structure features of the background, effectively limiting the search range in the search process, reducing the number of search points, thereby reducing the time cost of motion estimation.

In the embodiment of this disclosure, a to-be-encoded video consecutive sequence image is regarded as a 3D overall calculation object, and the content of the three-dimensional image block composed of consecutive frames is used for constraining a calculation process of the motion vector, so as to implement quick motion estimation and improve the accuracy of the vector field. Compared with the motion estimation method based on the macroblocks of the reference frame and the current frame in the related art, this method can effectively reduce the complexity of motion estimation and save 10% to 30% of the motion estimation time on the basis of ensuring the encoding rate-distortion performance.

The motion estimation method provided by the embodiment of this disclosure mainly eliminates temporal redundancy in video sequence frames through inter-frame prediction, may be used for compression encoding of video data, improves video transmission efficiency, may be applied to video conferences, video phones, and the like, and implements real-time transmission of high compression ratio video data under a condition of extremely low bit rate transmission. In addition, the method is further applicable to a 2D video and a stereo video, especially for various complex videos in conditions such as jitter during shooting, low image frame contrast, continuous and complex changes in motion scenarios, and the like, where good encoding rate-distortion performance can still be maintained.

The following continues to describe an exemplary structure in which the video motion estimation apparatus 455 according to an embodiment of this disclosure is implemented as a software module. In some embodiments, as shown in FIG. 2, the software module stored in the video motion estimation apparatus 455 of the memory 450 may be a video motion estimation apparatus in the terminal 400, including:

an obtaining module 4551, configured to obtain a plurality of image frames in a to-be-processed video, and perform scenario classification processing on the plurality of image frames to obtain a plurality of image frame sets, each image frame set including at least one image frame; a feature extraction module 4552, configured to extract a contour feature and a color feature of a foreground object of each image frame in each image frame set; a first determining module 4553, configured to determine a search range corresponding to each image frame set based on the contour feature of the foreground object of each image frame set; a second determining module 4554, configured to determine a starting search point of each predicted frame in each image frame set; and a motion estimation module 4555, configured to perform motion estimation processing in a search region corresponding to the search range of each predicted frame based on the starting search point of each predicted frame, a target block in a reference frame and the color feature of the foreground object, to obtain a motion vector corresponding to the target block.

In some embodiments, the first obtaining module is further configured to: determine a background image region of the plurality of image frames and determine image similarity between a plurality of the background image regions; and perform scenario classification processing on the plurality of image frames to obtain the plurality of image frame sets based on the image similarity between the plurality of the background image frame regions.

In some embodiments, the feature extraction module is further configured to perform the following processing for any image frame in any of the image frame sets: determining a foreground image region where the foreground object in the image frame is located; using location information of the foreground image region as the contour feature of the foreground object in the image frame; and obtaining the color feature of the foreground object in the image frame based on performing color extraction processing on the foreground image region.

In some embodiments, the first processing module is further configured to perform the following processing for any of the image frame sets: determining vertex coordinates in each foreground image region based on the location information of each foreground image region in the image frame sets; determining a first maximum value and a first minimum value corresponding to a first dimension and determining a second maximum value and a second minimum value corresponding to a second dimension from each vertex coordinates; and determining the search range corresponding to the image frame sets based on the first minimum value, the first maximum value, the second minimum value and the second maximum value.

In some embodiments, the second processing module is further configured to: determine location information of a reference target block in each reference frame in each image frame set, the reference target block being any of the target blocks in the reference frame; obtaining a predicted motion vector of each predicted frame through predicting the motion vector of each predicted frame in a set prediction mode, the prediction mode including at least one of the following: a median prediction mode, a uplayer prediction mode, and an origin point prediction mode; and determining the starting search point of each predicted frame based on the location information of the reference target block and the predicted motion vector.

In some embodiments, the motion estimation module is further configured to perform the following processing for any of the predicted frames: determining a first search template corresponding to the predicted frame; performing search processing in the search region corresponding to the search range of each predicted frame through the first search template by using the starting search point of each predicted frame as a center, to obtain a predicted target block corresponding to the reference target block in the predicted frame; determining a texture difference degree between the reference target block and the predicted target block; and determining the motion vector corresponding to the predicted target block based on the location information of the reference target block and the location information of the predicted target block, in a case that the texture difference degree is less than a difference threshold.

In some embodiments, the motion estimation module is further configured to determine a color difference degree and the texture difference degree between each predicted block in the predicted frame and the reference target block, in a case that the texture difference degree is greater than or equal to the difference threshold, the predicted block being a target block in the search region corresponding to the search range in the predicted frame; determine the predicted target block corresponding to the reference target block from each predicted block based on the color difference degree and the texture difference degree between each predicted block and the reference target block; and determine the motion vector corresponding to the predicted target block based on the location information of the reference target block and the location information of the predicted target block.

In some embodiments, the motion estimation module is further configured to determine a first motion direction of the foreground object in the predicted frame based on a predicted motion vector of the predicted target block in the predicted frame; and determine the first search template corresponding to the predicted frame based on the first motion direction of the foreground object.

In some embodiments, the motion estimation module is further configured to determine a plurality of first candidate blocks in the search region based on the first search template; determine a matching sequence of the plurality of first candidate blocks based on the predicted motion vector; perform matching processing on the plurality of first candidate blocks and the reference target block based on the matching sequence; and use a first candidate target block which successfully matches with the reference target block as the predicted target block corresponding to the reference target block in the predicted frame, in a case that the first candidate target block exists in the plurality of first candidate blocks.

In some embodiments, the motion estimation module is further configured to determine a second search template corresponding to the predicted frame based on a second motion direction in a case that the first candidate target block which successfully matches with the reference target block doesn't exist in the plurality of first candidate blocks, the second motion direction being different from the first motion direction; determine a plurality of second candidate blocks in the search region based on the second search template by using the starting search point as a center; determine a matching sequence of the plurality of second candidate blocks based on the predicted motion vector; perform matching processing on the plurality of second candidate blocks and the reference target block based on the matching sequence; and determine a second candidate target block which successfully matches with the reference target block as the predicted target block, in a case that the second candidate target block exists in the plurality of second candidate blocks.

Descriptions of apparatus embodiments of this disclosure are similar to the descriptions of the foregoing method embodiments. The apparatus embodiments have beneficial effects similar to those of the method embodiments and thus are not repeatedly described. Refer to descriptions in the method embodiments of this disclosure for technical details undisclosed in the apparatus embodiments of this disclosure.

An embodiment of this disclosure provides a storage medium storing executable instructions. When the executable instructions are executed by a processor, the processor is caused to perform the method in the embodiments of this disclosure, for example, the method shown in FIGS. 4A-4C.

In some embodiments, the storage medium may be a computer-readable storage medium, a memory such as a ferromagnetic random access memory (FRAM), a read only memory (ROM), a programmable read only memory (PROM), an erasable programmable read only memory (EPROM), an electrically erasable programmable read only memory (EEPROM), a flash memory (Flash Memory), a magnetic storage, an optic disc, or a compact disc-read only memory (CD-ROM), or may be any device including one of or any combination of the foregoing memories.

In some embodiments, the executable instructions may be written in any form of programming language (including a compiled or interpreted language, or a declarative or procedural language) by using the form of a program, a software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in a plurality of collaborative files (for example, be stored in files of one or modules, subprograms, or code parts). In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A video motion estimation method, comprising:
   obtaining a plurality of image frames in a video, and performing scenario classification processing on the plurality of image frames by determining a background image region of each of the plurality of image frames and an image similarity between each of the background image regions to obtain a plurality of image frame sets, each image frame set being associated with and classified based on a corresponding scenario and comprising plural image frames;
   extracting a contour feature and a color feature of a foreground object of each image frame in each of the plurality of image frame sets;
   determining a search range corresponding to each of the plurality of image frame sets based on the contour feature and the color feature of the foreground object of the image frames in the respective image frame set;

determining a starting search point in each predicted frame in each of the plurality of image frame sets, wherein the respective image frame set comprises at least one predicted frame and at least one reference frame; and for each of the plurality of image frame sets, performing motion estimation processing in a search region corresponding to the search range of each predicted frame in the respective image frame set based on the starting search point of the respective predicted frame, a reference block in the at least one reference frame of the respective image frame set, and the color feature of the foreground object, to obtain a motion vector corresponding to the reference block.

2. The method according to claim 1, wherein the performing the scenario classification processing comprises:
performing the scenario classification processing on the plurality of image frames to obtain the plurality of image frame sets based on the image similarity between the background image regions.

3. The method according to claim 1, wherein the extracting the contour feature and the color feature comprises:
for each image frame in each of the plurality of the image frame sets,
determining a foreground image region where the foreground object in the respective image frame is located;
setting location information of the foreground image region as the contour feature of the foreground object in the respective image frame; and
obtaining the color feature of the foreground object in the respective image frame based on performing color extraction processing on the foreground image region.

4. The method according to claim 3, wherein the determining the search range comprises:
for each of the plurality of the image frame sets,
determining vertex coordinates of the foreground image region of each image frame in the respective image frame set based on the location information of the foreground image region of each image frame in the respective image frame set;
determining a first maximum value and a first minimum value corresponding to a first dimension and determining a second maximum value and a second minimum value corresponding to a second dimension of the vertex coordinates; and
determining the search range corresponding to the respective image frame set based on the first minimum value, the first maximum value, the second minimum value, and the second maximum value.

5. The method according to claim 1, wherein the determining the starting search point comprises:
determining location information of the reference block in the at least one reference frame in the respective image frame set;
obtaining a predicted motion vector of the reference block in each predicted frame of the respective image frame set through a prediction mode, the prediction mode comprising at least one of: a median prediction mode, a uplayer prediction mode, or an origin point prediction mode; and
determining the starting search point of each predicted frame in the respective image frame set based on the location information of the reference block and the predicted motion vector.

6. The method according to claim 5, wherein the performing the motion estimation processing comprises:
for each of the predicted frames in each of the plurality of the image frame sets,
determining a first search template corresponding to the respective predicted frame;
performing search processing in the search region corresponding to the search range of the respective predicted frame through the first search template by using the starting search point of the respective predicted frame as a center, to obtain a predicted block in the respective predicted frame corresponding to the reference block in the at least one reference frame;
determining a texture difference between the reference block and the predicted block; and
in response to a determination that the texture difference between the reference block and the predicted block is less than a difference threshold,
determining the motion vector corresponding to the predicted block based on the location information of the reference block and location information of the predicted block.

7. The method according to claim 6, further comprising:
in response to a determination that the texture difference between the reference block and the predicted block is greater than or equal to the difference threshold,
determining a color difference and the texture difference between each of plural candidate predicted blocks in the respective predicted frame of each of the plurality of the image frame sets and the reference block, the candidate predicted blocks being blocks in the search region corresponding to the search range in the respective predicted frame;
determining the predicted block corresponding to the reference block from among the candidate predicted blocks based on the color difference and the texture difference between each candidate predicted block and the reference block; and
determining the motion vector corresponding to the predicted block based on the location information of the reference block and the location information of the predicted block.

8. The method according to claim 6, wherein the determining the first search template comprises:
determining a first motion direction of the foreground object in the respective predicted frame based on the predicted motion vector of the predicted block in the respective predicted frame; and
determining the first search template corresponding to the respective predicted frame based on the first motion direction of the foreground object.

9. The method according to claim 8, wherein the performing the search processing comprises:
determining a plurality of first candidate blocks in the search region based on the first search template;
determining a matching sequence of the plurality of first candidate blocks based on the predicted motion vector;
performing matching processing on the plurality of first candidate blocks and the reference block based on the matching sequence; and
setting one of the first candidate blocks which successfully matches with the reference block as the predicted block corresponding to the reference block in the respective predicted frame.

10. The method according to claim 9, further comprising, in response to a determination that the one of the first candidate blocks which successfully matches with the reference block does not exist among the first candidate blocks:
   determining a second search template corresponding to the respective predicted frame based on a second motion direction, the second motion direction being different from the first motion direction;
   determining a plurality of second candidate blocks in the search region based on the second search template by using the starting search point as a center;
   determining a matching sequence of the plurality of second candidate blocks based on the predicted motion vector;
   performing matching processing on the plurality of second candidate blocks and the reference block based on the matching sequence; and
   determining one of the second candidate blocks which successfully matches with the reference block as the predicted block.

11. A video motion estimation apparatus, comprising:
processing circuitry configured to:
   obtain a plurality of image frames in a video, and perform scenario classification processing on the plurality of image frames by determining a background image region of each of the plurality of image frames and an image similarity between each of the background image regions to obtain a plurality of image frame sets, each image frame set being associated with and classified based on a corresponding scenario and comprising plural image frames;
   extract a contour feature and a color feature of a foreground object of each of the plurality of image frame sets;
   determine a search range corresponding to each of the plurality of image frame sets based on the contour feature and the color feature of the foreground object of the image frames in the respective image frame set;
   determine a starting search point in each predicted frame in each of the plurality of image frame sets, wherein the respective image frame set comprises at least one predicted frame and at least one reference frame; and
   for each of the plurality of image frame sets, perform motion estimation processing in a search region corresponding to the search range of each predicted frame in the respective image frame set based on the starting search point of the respective predicted frame, a reference block in the at least one reference frame of the respective image frame set, and the color feature of the foreground object, to obtain a motion vector corresponding to the reference block.

12. The apparatus according to claim 11, wherein the processing circuitry is further configured to:
   perform the scenario classification processing on the plurality of image frames to obtain the plurality of image frame sets based on the image similarity between the background image regions.

13. The apparatus according to claim 11, wherein the processing circuitry is further configured to:
   for each image frame in each of the plurality of the image frame sets,
      determine a foreground image region where the foreground object in the respective image frame is located;
      set location information of the foreground image region as the contour feature of the foreground object in the respective image frame; and
      obtain the color feature of the foreground object in the respective image frame based on performing color extraction processing on the foreground image region.

14. The apparatus according to claim 13, wherein the processing circuitry is further configured to;
   for each of the plurality of the image frame sets,
      determine vertex coordinates of the foreground image region of each image frame in the respective image frame set based on the location information of the foreground image region of each image frame in the respective image frame set;
      determine a first maximum value and a first minimum value corresponding to a first dimension and determine a second maximum value and a second minimum value corresponding to a second dimension of the vertex coordinates; and
      determine the search range corresponding to the respective image frame set based on the first minimum value, the first maximum value, the second minimum value, and the second maximum value.

15. The apparatus according to claim 11, wherein the processing circuitry is further configured to;
   determine location information of the reference block in the at least one reference frame in the respective image frame set;
   obtain a predicted motion vector of the reference block in each predicted frame of the respective image frame set through a prediction mode, the prediction mode comprising at least one of: a median prediction mode, a uplayer prediction mode, or an origin point prediction mode; and
   determine the starting search point of each predicted frame in the respective image frame set based on the location information of the reference block and the predicted motion vector.

16. The apparatus according to claim 15, wherein the processing circuitry is further configured to;
   for each of the predicted frames in each of the plurality of the image frame sets,
      determine a first search template corresponding to the respective predicted frame;
      perform search processing in the search region corresponding to the search range of the respective predicted frame through the first search template by using the starting search point of the respective predicted frame as a center, to obtain a predicted block in the respective predicted frame corresponding to the reference block in the at least one reference frame;
      determine a texture difference between the reference block and the predicted block; and
      in response to a determination that the texture difference between the reference block and the predicted block is less than a difference threshold, determine the motion vector corresponding to the predicted block based on the location information of the reference block and location information of the predicted block.

17. The apparatus according to claim 16, wherein the processing circuitry is further configured to:
   in response to a determination that the texture difference between the reference block and the predicted block is greater than or equal to the difference threshold,
      determine a color difference and the texture difference between each of plural candidate predicted blocks in the respective predicted frame of each of the plurality of the image frame sets and the reference block, the candidate predicted blocks being blocks in the search region corresponding to the search range in the respective predicted frame;

determine the predicted block corresponding to the reference block from among the candidate predicted blocks based on the color difference and the texture difference between each candidate predicted block and the reference block; and determine the motion vector corresponding to the predicted block based on the location information of the reference block and the location information of the predicted block.

18. The apparatus according to claim 16, wherein the processing circuitry is further configured to determine a first motion direction of the foreground object in the respective predicted frame based on the predicted motion vector of the predicted block in the respective predicted frame; and determine the first search template corresponding to the respective predicted frame based on the first motion direction of the foreground object.

19. The apparatus according to claim 18, wherein the processing circuitry is further configured to determine a plurality of first candidate blocks in the search region based on the first search template;

determine a matching sequence of the plurality of first candidate blocks based on the predicted motion vector;

perform matching processing on the plurality of first candidate blocks and the reference block based on the matching sequence; and set one of the first candidate blocks which successfully matches with the reference block as the predicted block corresponding to the reference block in the respective predicted frame.

20. A non-transitory computer-readable storage medium storing computer-readable instructions thereon, which, when executed by a processor, cause the processor to perform a video motion estimation method comprising:

obtaining a plurality of image frames in a video, and performing scenario classification processing on the plurality of image frames by determining a background image region of each of the plurality of image frames and an image similarity between each of the background image regions to obtain a plurality of image frame sets, each image frame set being associated with and classified based on a corresponding scenario and comprising plural image frames;

extracting a contour feature and a color feature of a foreground object of each image frame in each of the plurality of image frame sets;

determining a search range corresponding to each of the plurality of image frame sets based on the contour feature and the color feature of the foreground object of the image frames in the respective image frame set;

determining a starting search point in each predicted frame in each of the plurality of image frame sets, wherein the respective image frame set comprises at least one predicted frame and at least one reference frame; and for each of the plurality of image frame sets, performing motion estimation processing in a search region corresponding to the search range of each predicted frame in the respective image frame set based on the starting search point of the respective predicted frame, a reference block in the at least one reference frame of the respective image frame set, and the color feature of the foreground object, to obtain a motion vector corresponding to the reference block.

* * * * *